US011619996B2

(12) United States Patent
Stolzenberg et al.

(10) Patent No.: US 11,619,996 B2
(45) Date of Patent: Apr. 4, 2023

(54) CONTENT MOVEMENT AND INTERACTION USING A SINGLE CONTROLLER

(71) Applicant: Magic Leap, Inc., Plantation, FL (US)

(72) Inventors: Karen Stolzenberg, Venice, CA (US); Marc Alan McCall, Plantation, FL (US); Frank Alexander Hamilton, IV, Martinsburg, WV (US); Cole Parker Heiner, Vista, CA (US); John Austin Day, Miami, FL (US); Eric Norman Yiskis, Boca Raton, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/673,333

(22) Filed: Feb. 16, 2022

(65) Prior Publication Data
US 2022/0171457 A1 Jun. 2, 2022

Related U.S. Application Data

(63) Continuation of application No. 17/153,201, filed on Jan. 20, 2021, now Pat. No. 11,294,461.

(60) Provisional application No. 62/965,708, filed on Jan. 24, 2020.

(51) Int. Cl.
G06F 3/01 (2006.01)
G02B 27/01 (2006.01)
G02B 27/00 (2006.01)

(52) U.S. Cl.
CPC ......... *G06F 3/013* (2013.01); *G02B 27/0093* (2013.01); *G02B 27/017* (2013.01); *G06F 3/016* (2013.01)

(58) Field of Classification Search
CPC ....... G06F 3/013; G06F 3/016; G02B 27/017; G02B 27/0093
See application file for complete search history.

(56) References Cited

U.S. PATENT DOCUMENTS

| 6,850,221 | B1 | 2/2005 | Tickle |
| 11,294,461 | B2 | 4/2022 | Stolzenberg et al. |
| 2006/0028436 | A1 | 2/2006 | Armstrong |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2012/0319949 | A1 | 12/2012 | Lee |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |

(Continued)

FOREIGN PATENT DOCUMENTS

WO 2021/150623 A1 7/2021

OTHER PUBLICATIONS

International Search Report and Written Opinion for PCT Application No. PCT/US2021/014208, dated Apr. 12, 2021.

(Continued)

*Primary Examiner* — Mark Edwards
*Assistant Examiner* — Chayce R Bibbee
(74) *Attorney, Agent, or Firm* — Seed IP Law Group LLP

(57) ABSTRACT

Examples of systems and methods for interacting with content and updating the location and orientation of that content using a single controller. The system may allow a user to use the same controller for moving content around the room and interacting with that content by tracking a range of the motion of the controller.

20 Claims, 32 Drawing Sheets

(56) References Cited

U.S. PATENT DOCUMENTS

| | | |
|---|---|---|
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0209648 A1 | 7/2016 | Haddick et al. |
| 2018/0307303 A1 | 10/2018 | Powderly et al. |
| 2019/0362562 A1 | 11/2019 | Benson |
| 2020/0027275 A1 | 1/2020 | Wan |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, Aug. 4, 1997, pp. 355-385. https://web.archive.org/web/20010604100006/http:////www.cs.unc.edu/~azuma/ARpresence.pdf.

Azuma, "Predictive Tracking for Augmented Reality," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Li, et al., "Gaze Direction Visualization Techniques for Collaborative Wide-Area Model-Free Augmented Reality," ACM, Oct. 20, 2019. Retrieved from URL:https://dl.acm.org.doi/pdf/10.1145/3357251.3357583.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

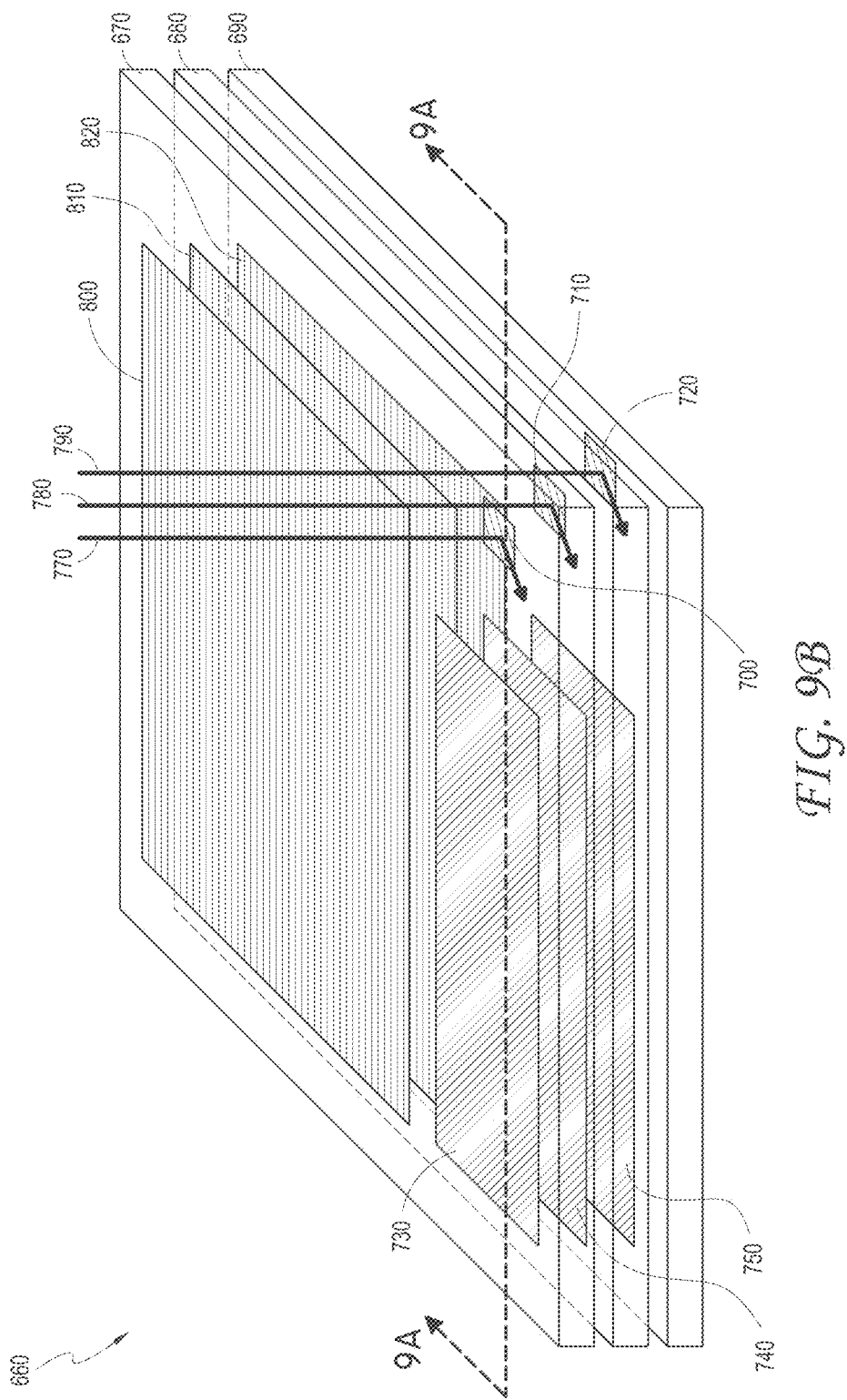

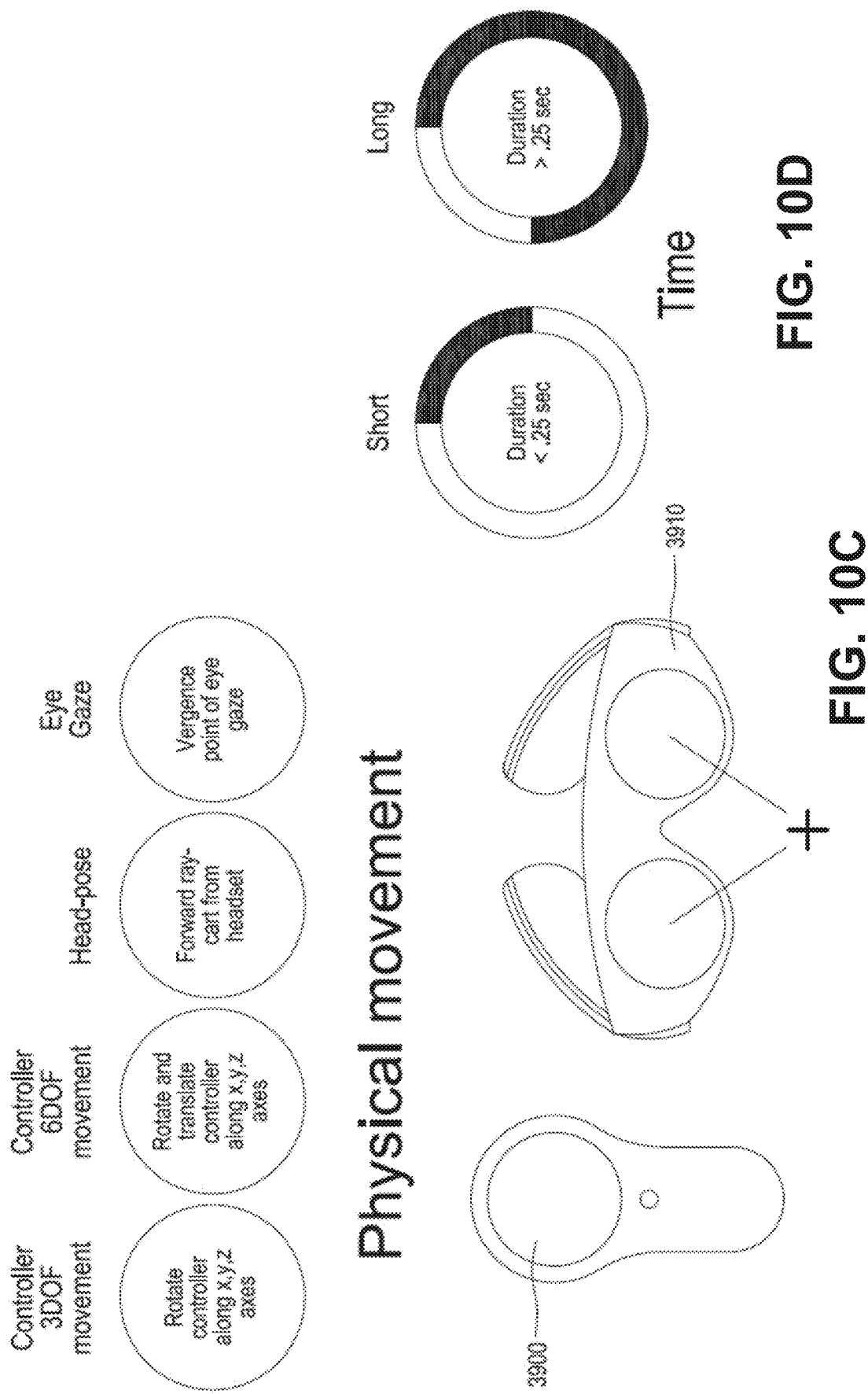

CONTENT MOVEMENT AND INTERACTION USING A SINGLE CONTROLLER

CROSS REFERENCE TO RELATED APPLICATIONS

This application is a continuation of U.S. patent application Ser. No. 17/153,201, filed on Jan. 20, 2021, entitled "CONTENT MOVEMENT AND INTERACTION USING A SINGLE CONTROLLER," which claims the benefit of priority under 35 U.S.C. § 119(e) to U.S. Provisional Application No. 62/965,708, filed on Jan. 24, 2020, entitled "CONTENT MOVEMENT AND INTERACTION USING A SINGLE CONTROLLER," the disclosures of each of which are hereby incorporated by reference herein in their entirety.

FIELD

The present disclosure generally relates to systems and methods to facilitate interactive virtual or augmented reality environments for one or more users.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Embodiments of the present disclosure are directed to devices, systems, and methods for facilitating virtual or augmented reality interaction for one or more users.

Further details of features, objects, and advantages of the disclosure are described below in the detailed description, drawings, and claims. Both the foregoing general description and the following detailed description are exemplary and explanatory and are not intended to be limiting as to the scope of the disclosure.

In some configurations, an augmented reality (AR) system can include: an AR display configured to present virtual content to a user of the AR system; an outward facing camera configured to capture one or more images of an environment of the user; a handheld controller defining a pointing vector indicating a pointing direction of the handheld controller; a hardware processor in communication with the AR display, the outward facing camera, and the handheld controller, the hardware processor can be programmed to: display an interactive content object via the AR display; in a first interaction mode, while the pointing vector remains within the interactive content object, indicating movements of the handheld controller within the interactive content object and allowing interactions with the interactive content object via the handheld controller; monitoring changes of the pointing vector with reference to the interactive content object; in response to detecting movement of the pointing vector outside the interactive content object, updating the system to a second interaction mode wherein the handheld controller causes movement of the interactive content object such that the interactive content object follows movements of the handheld controller in the virtual environment; and in response to detecting movement of the pointing vector of the handheld controller inside the interactive content object, updating the system to the first interaction mode.

In some configurations, an augmented reality (AR) system can include: an AR display configured to present virtual content to a user of the AR system; a handheld controller having at least six degrees of freedom; and a hardware processor in communication with the AR display, the outward facing camera, and the handheld controller, the hardware processor can be programmed to: display interactive content at a first content location; determine a first pointing vector comprising a direction indicated by the controller; determine whether the first pointing vector intersects with a bounded volume associated with the interactive content; in response to determining that the first pointing vector does not intersect the bounded volume, move the interactive content to a second content location associated with a point along the direction of the first pointing vector; and in response to determining that the first pointing vector intersects the bounded volume, receive an indication to interact with the interactive content at the first content location.

A method for displaying virtual content can include: displaying interactive content at a first content location; determining a first pointing vector comprising a direction indicated by a controller; determining whether the first pointing vector intersects with a bounded volume associated with the interactive content; in response to determining that the first pointing vector does not intersect the bounded volume, moving the interactive content to a second content location associated with a point along the direction of the first pointing vector; and in response to determining that the first pointing vector intersects the bounded volume, receiving an indication to interact with the interactive content at the first content location.

BRIEF DESCRIPTION OF THE DRAWINGS

Throughout the drawings, reference numbers are re-used to indicate correspondence between referenced elements. The following drawings and the associated descriptions are provided to illustrate embodiments of the present disclosure and do not limit the scope of the claims.

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIG. 9B illustrates a perspective view of an example of the plurality of stacked waveguides of FIG. 9A.

FIG. 10C illustrates examples of user inputs received through physical movement of a controller or a head-mounted device (HMD).

FIG. 10D illustrates examples of how user inputs may have different durations.

DETAILED DESCRIPTION

Figure 1:
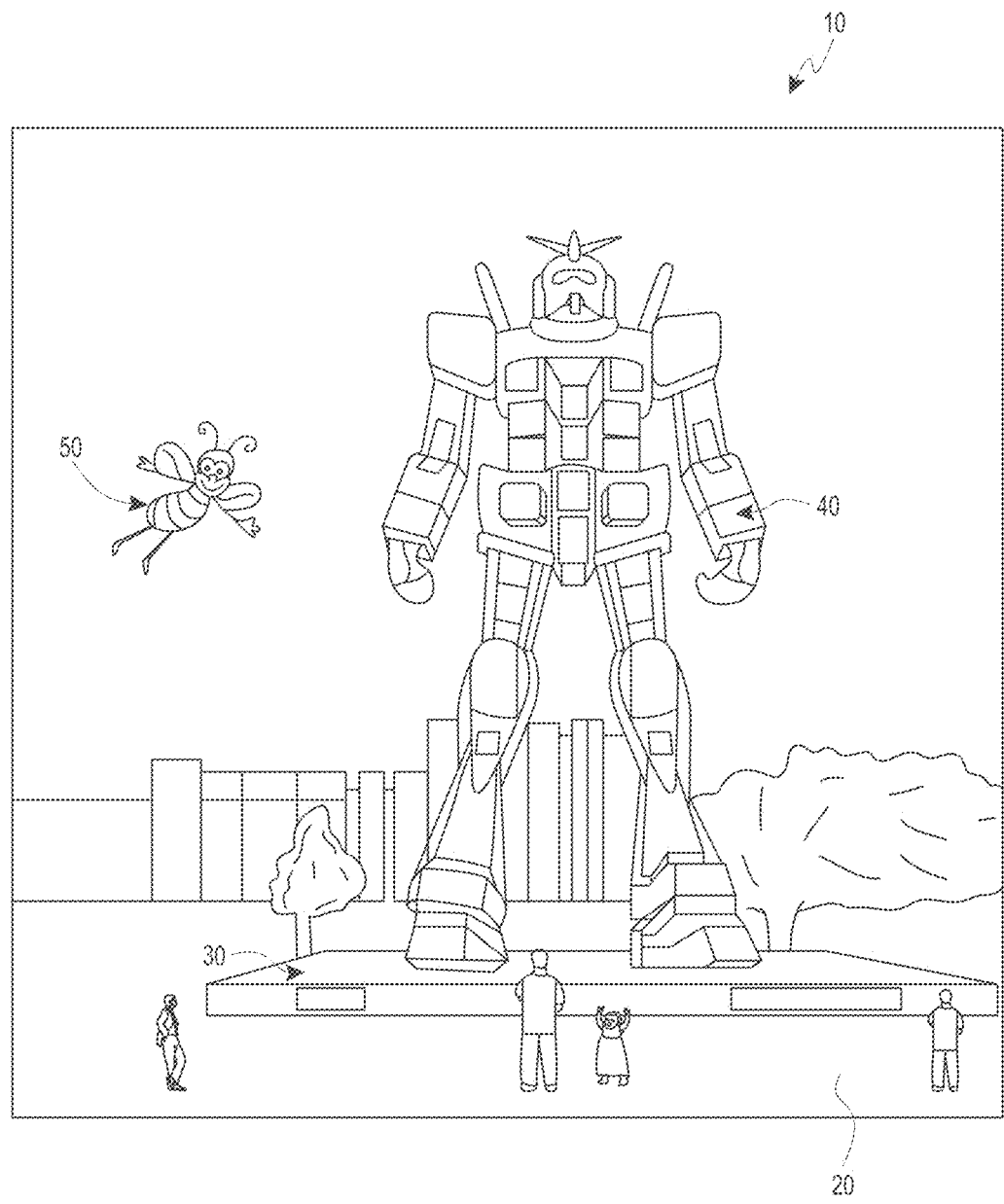
FIG. 1 illustrates a user's view of an augmented reality (AR) scene through an AR device.

AR and/or VR systems may display virtual content to a user, or viewer. For example, this content may be displayed on a head-mounted display, e.g., as part of eyewear, that projects image information to the user's eyes. In addition, where the system is an AR system, the display may also transmit light from the surrounding environment to the user's eyes, to allow a view of that surrounding environment. As used herein, it will be appreciated that a "head-mounted" or "head mountable" display is a display that may be mounted on the head of a viewer or user. Such displays may be understood to form parts of a display system.

In various augmented reality and virtual reality display systems, an out-coupling element such as a diffractive or reflective out-coupling element out-couples light from a waveguide toward an eye of a user. However, a typical out-coupling element may not be directional, and may be structured so as to output light in a variety of directions at all regions within the out-coupling optical element. Thus, while a portion of the light out-coupled by the out-coupling element may be usefully directed toward the pupil of the eye of the user where it will inter the eye to form images, other light out-coupled by the out-coupling element may not be incident at or near the pupil of the eye and thus does not contribute to the images formed by the display system.

Accordingly, it may be desirable to design display systems that can increase or optimize efficiency by targeting the out-coupling of light toward the pupil of the eye of the user, and by reducing the amount of light that is out-coupled in other directions. By targeting out-coupling toward the pupil, such systems may reduce the amount of light energy that must be generated by the light projection system or other display light source in order to produce an image of a given brightness in the eye of a wearer. Various embodiments of the present technology provide systems including out-coupling elements, in-coupling elements, and/or light projection systems configured to selectively direct image light toward the pupil of the eye of the wearer. Such systems may thereby advantageously improve the efficiency of the display devices disclosed herein, as they may increase the proportion of a given amount of light produced by a light projection system that is used to form images perceived by a user, and may reduce the proportion of the light that falls on other portions of the user's eye or face, or that otherwise does not contribute to the images perceived by the user.

Reference will now be made to the drawings, in which like reference numerals refer to like parts throughout. Unless indicated otherwise, the drawings are schematic and not necessarily drawn to scale.

A. Terms

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Headpose (or "head pose"): position and/or orientation of a wearable headset and, by proxy, of the user's head in the real world. Head pose may be determined using sensors such as inertial measurement units (IMUs), accelerometers, gyroscopes, etc. A head pose ray that extends in the direction of the head pose may be used to interact with virtual objects. For example, when a user is pointing or looking at a prism or an object, the object or prism is intersected by the user's head pose ray.

Controller: a handheld controller, such as a totem. A control may provide multiple degrees of freedom movement, such as 6DoF (Six Degrees of Freedom).

Controller pose: position and/or orientation of a controller. A controller pose can be used to determine an area, volume, or point of a mixed reality environment at which the controller is pointing.

Prism: container, area, or volume associated with mixed reality content or a mixed reality space. For example, a prism may contain one or more virtual content items that may be selectable by a user. A prism may spawn when an application is launched, and then may spawn sibling or child prisms to create flexible layouts. An application within a prism may be configured to control where these hierarchical prisms will appear, which is typically within the proximity of the first prism and easily discoverable by a user. A prism may provide feedback to a user. In some embodiments, the feedback may be a title that is only displayed to the user when the prism is targeted with head pose. In some embodiments, the feedback may be a glow around the prism. Prism glow (and/or other prism feedback) may also be used in sharing to give user feedback of which prisms are being shared.

Focus: characteristic of an object, such as a prism, that allows interactive objects to be selected.

Input Focus: characteristic of an object, such as a prism or application that causes the object's cursor to be refreshed and rendered as the active system cursor. In some implementations, there can be multiple focus objects but only one with input focus.

3D Content: A virtual object that can be displayed in the 3D environment of the user. The 3D content can be static, animated, manipulable, or otherwise interacted with. 3D content can include web based content generated by user interactions with web domains or web pages using, for example, the browser tile.

A. Example Augmented Reality Scenario

FIG. 1 depicts an illustration of an augmented reality scenario with certain virtual reality objects, and certain actual reality objects viewed by a person. FIG. 1 depicts an augmented reality scene 100, wherein a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 (e.g., a bumble bee) flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

B. Example Display Systems

Figure 2:
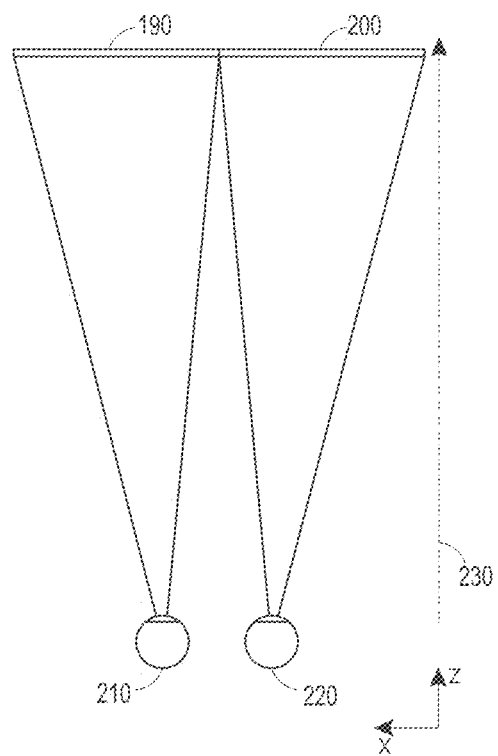
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
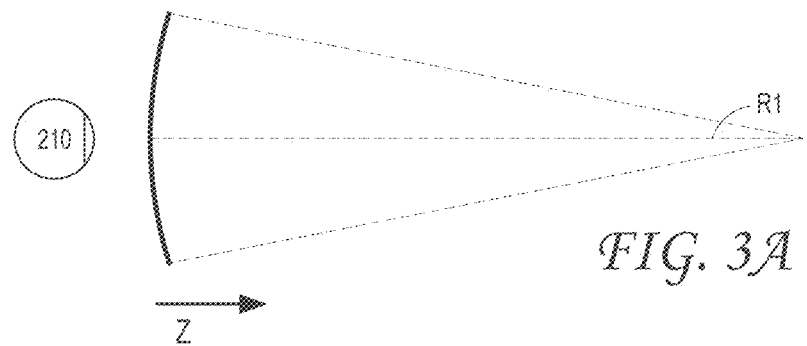
FIGS. 3A-3C illustrate relationships between radius of curvature and focal radius.
Figure 3B:
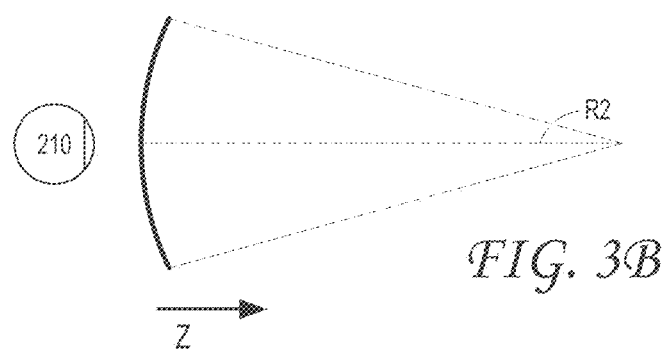
Figure 3C:
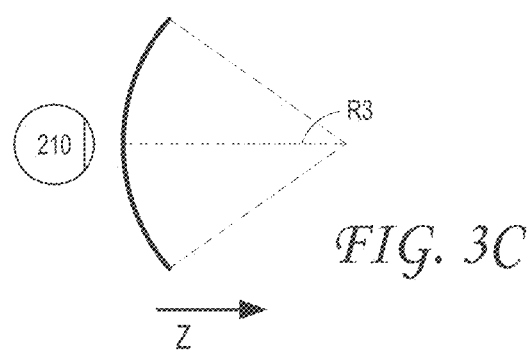

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it will be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
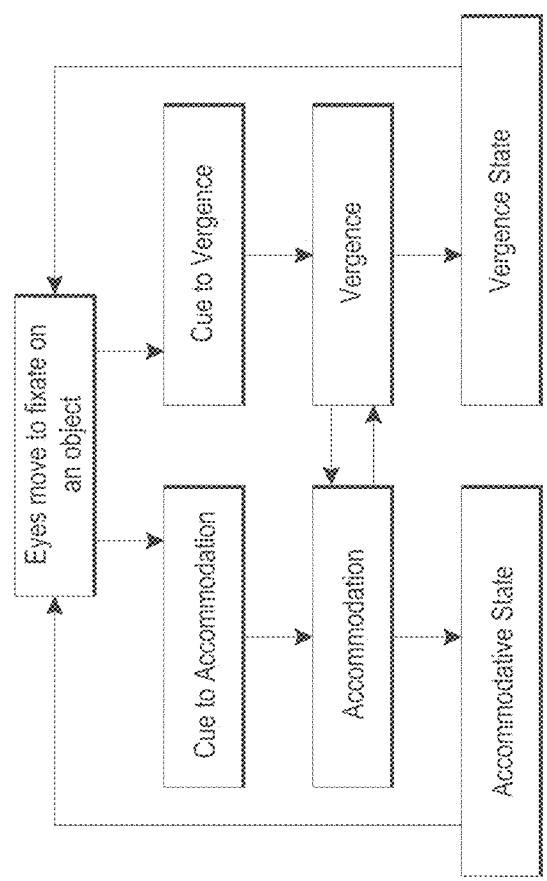
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
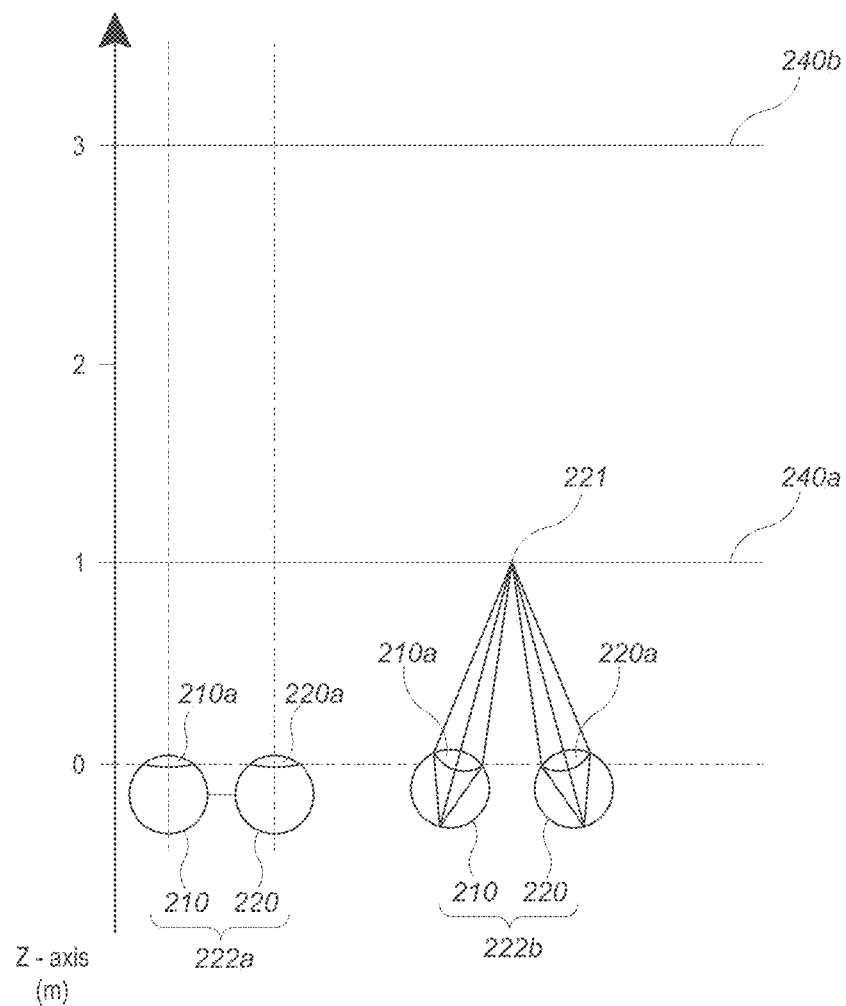
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
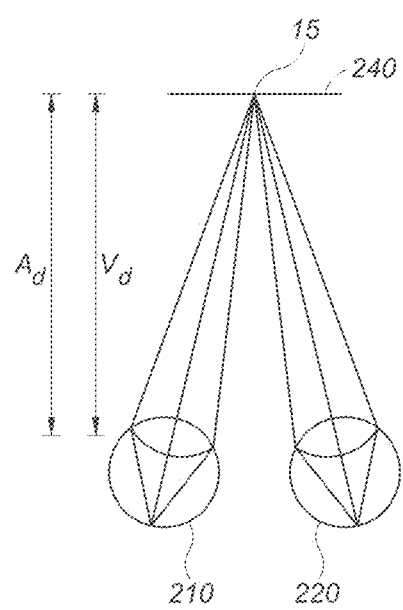
FIG. 4C illustrates an example of a representation of a top-down view of a user viewing content via a display system.
Figure 4D:
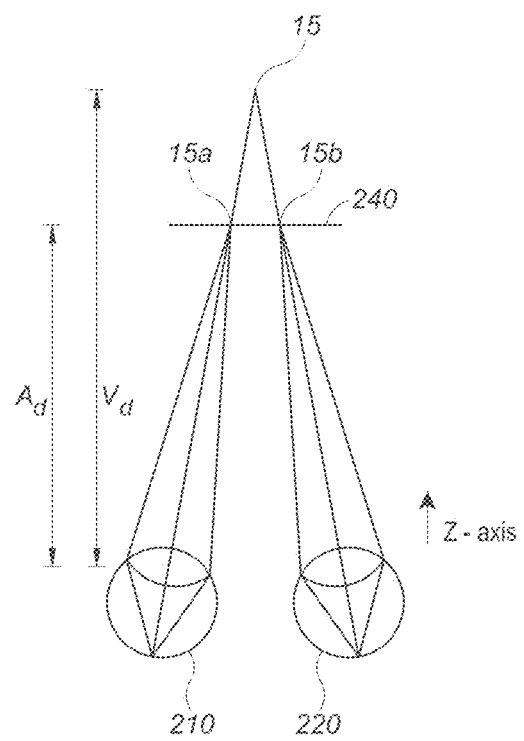
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
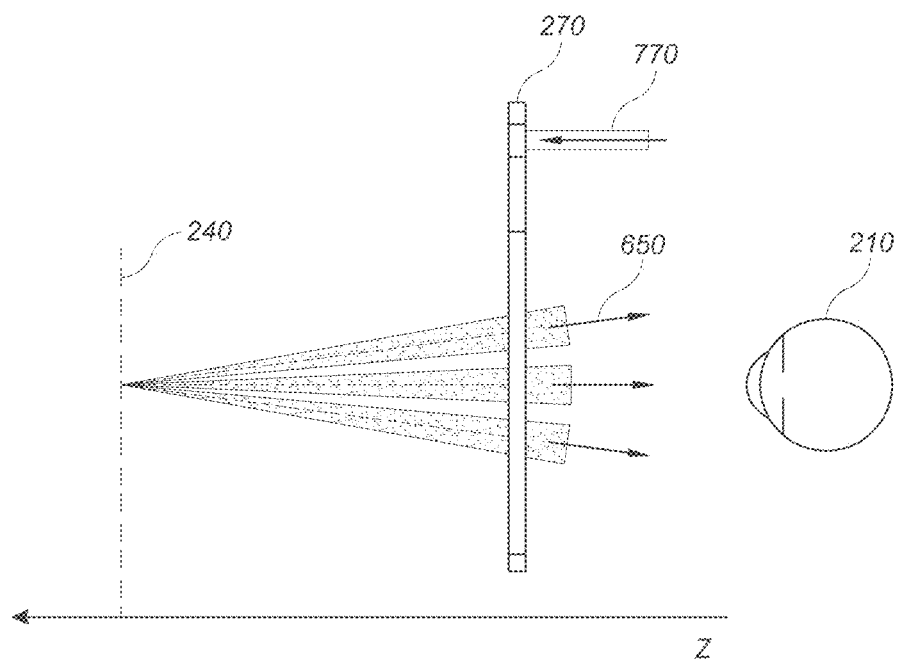
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
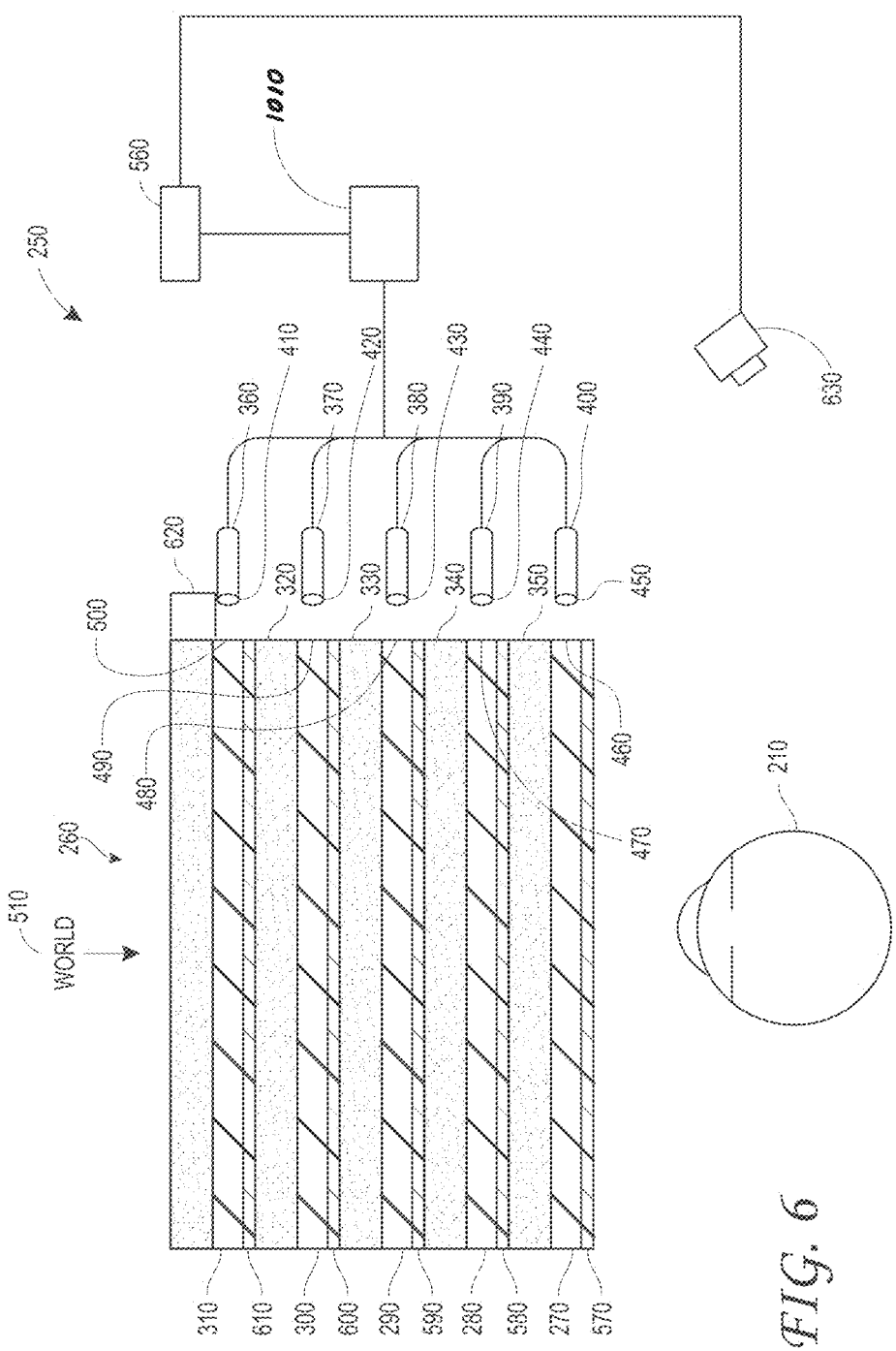
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses.

The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is encoded with image information and provided by a light projector system 1010, as discussed further herein. In some embodiments, the light projector system 1010 may comprise one or more emissive pixel arrays. It will be appreciated that the emissive pixel arrays may each comprise a plurality of light-emitting pixels, which may be configured to emit light of varying intensities and colors. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the pixel array of the light projector system 1010 and the image may be the image on the depth plane.

A controller 560 controls the operation of one or more of the stacked waveguide assembly 260, including operation of the image injection devices 360, 370, 380, 390, 400, the light projection system 1010. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
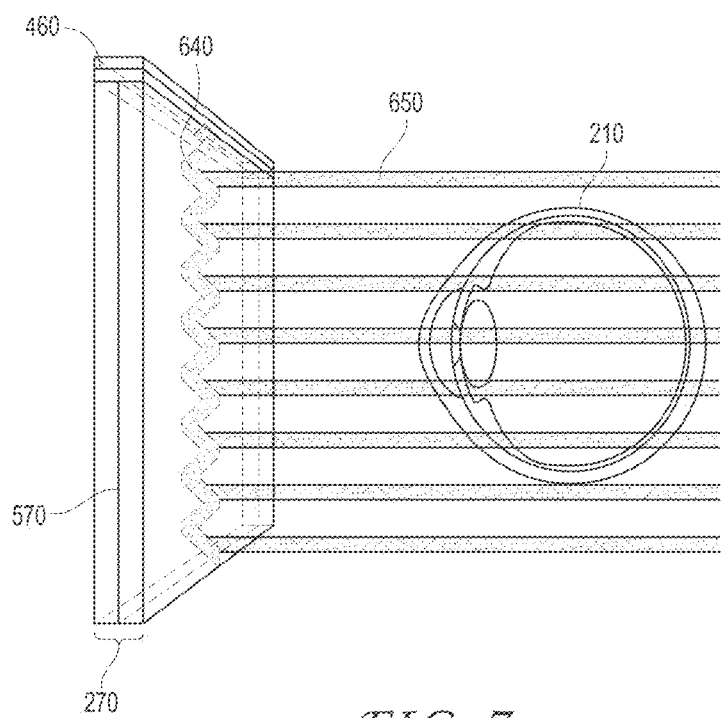
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
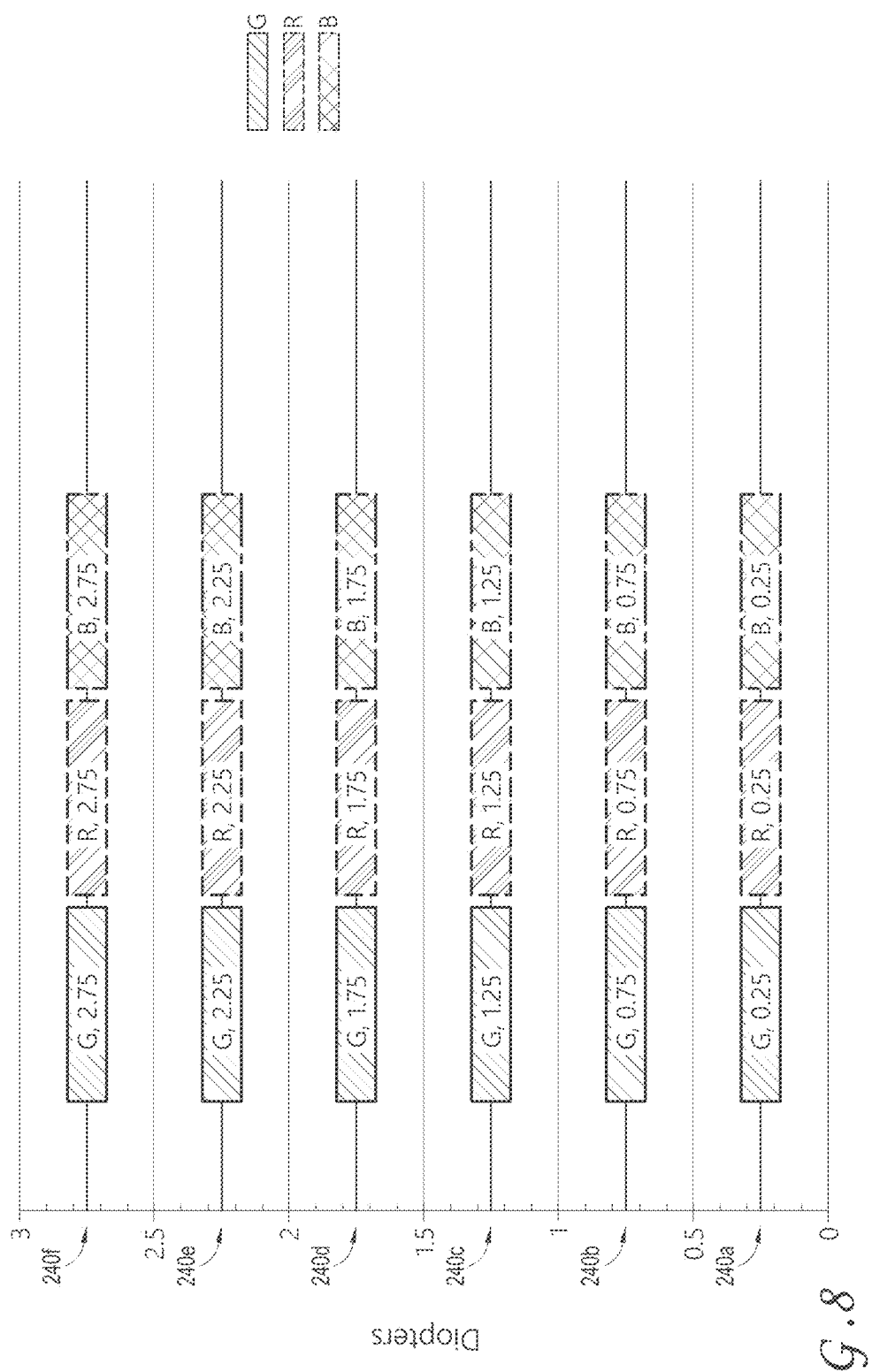
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light projection system 1010 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
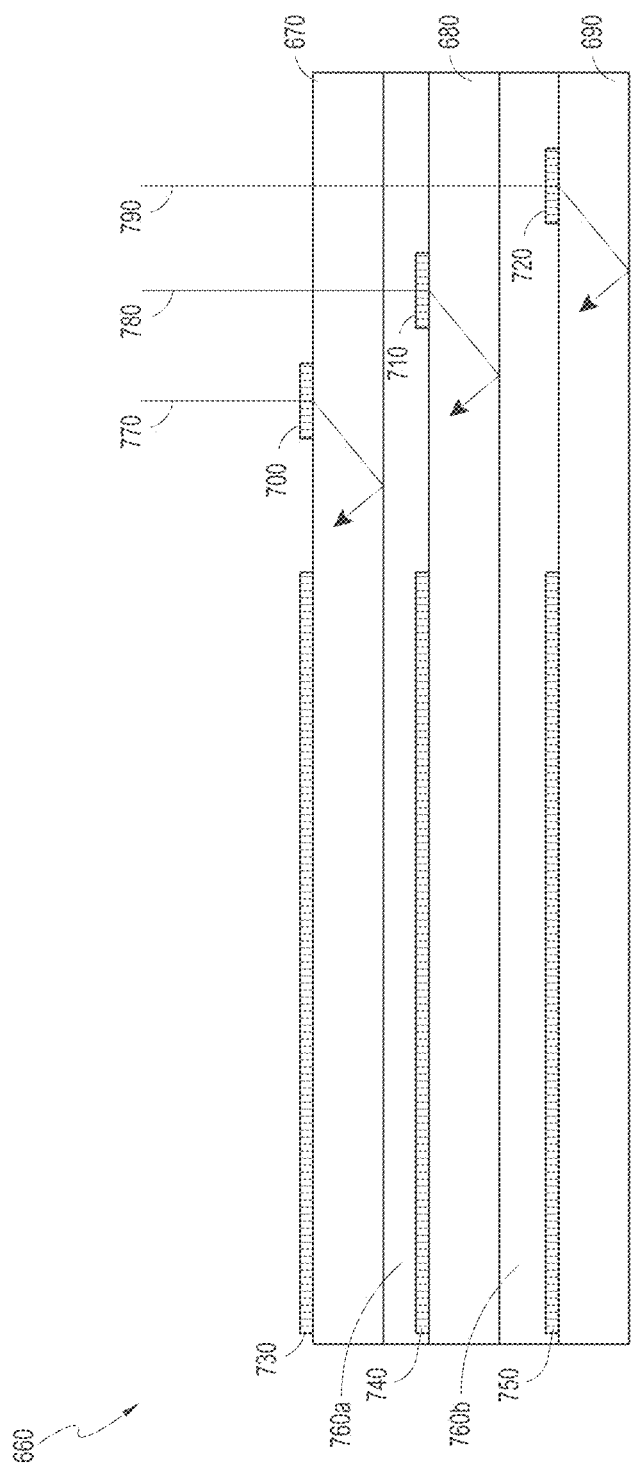
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 are intended for different waveguides (e.g., waveguides configured to output light with different amounts of wavefront divergence, and/or configured to output light having different properties, such as different wavelengths or colors). Thus, in some embodiments, the light rays 770, 780, 790 may have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
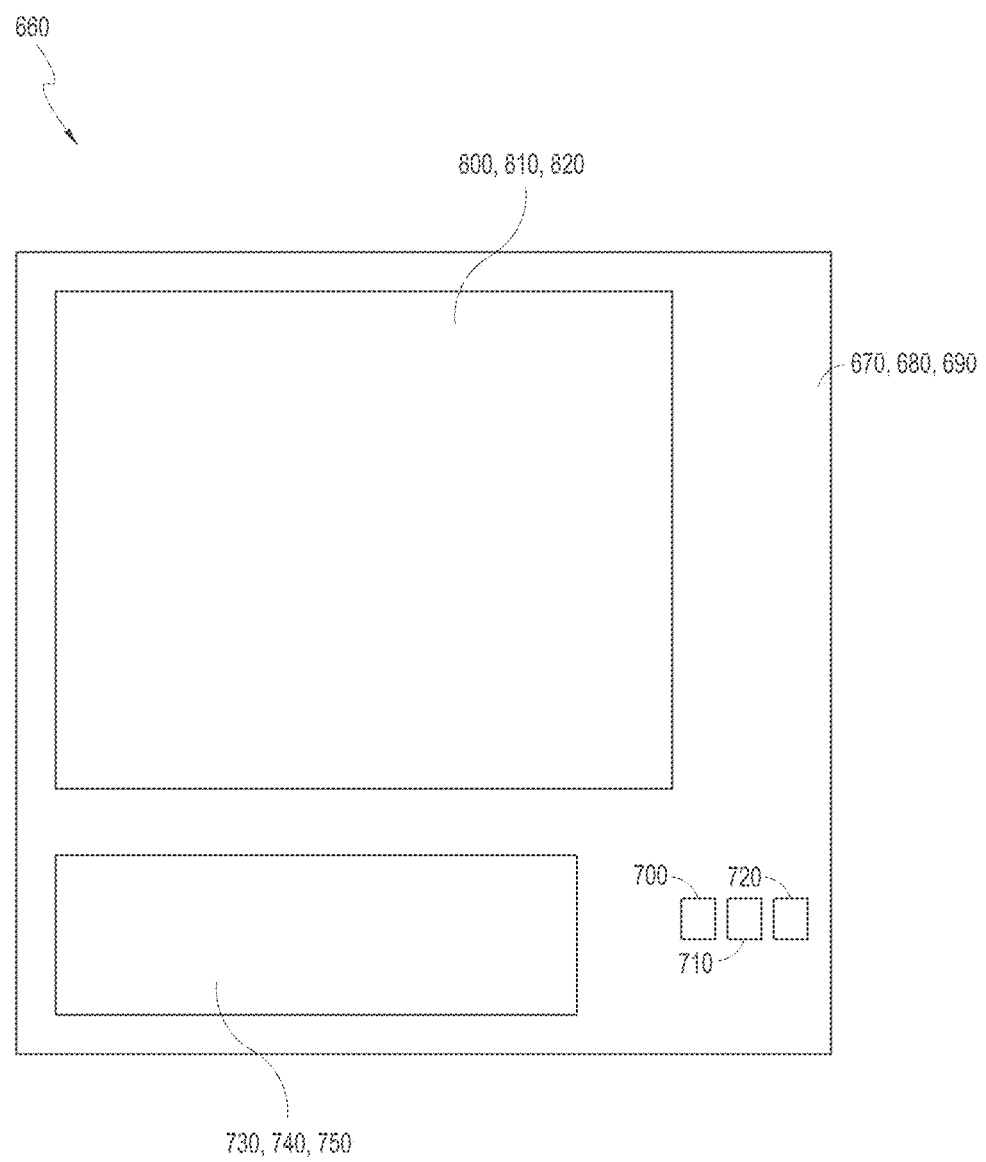
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
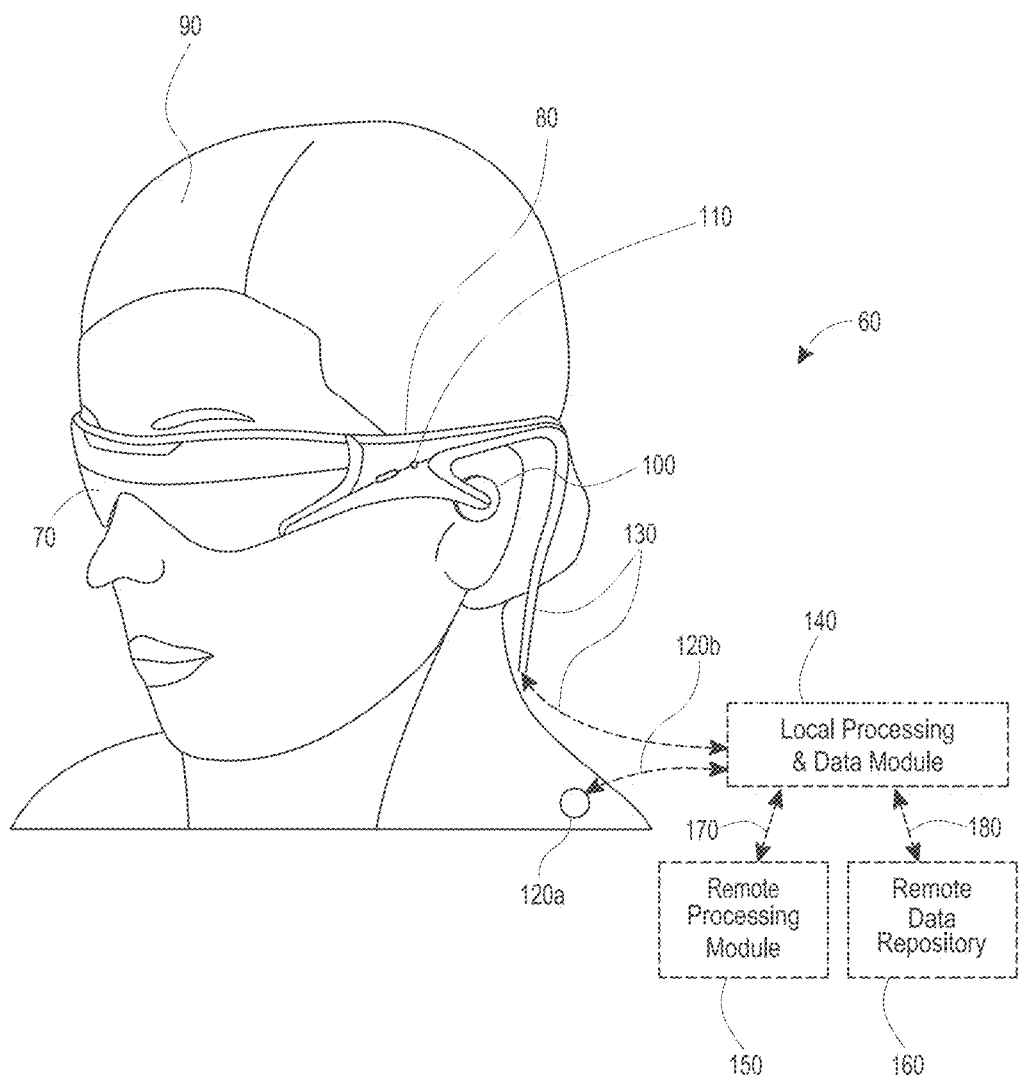
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing

C. Examples of User Inputs

Figure 10A:
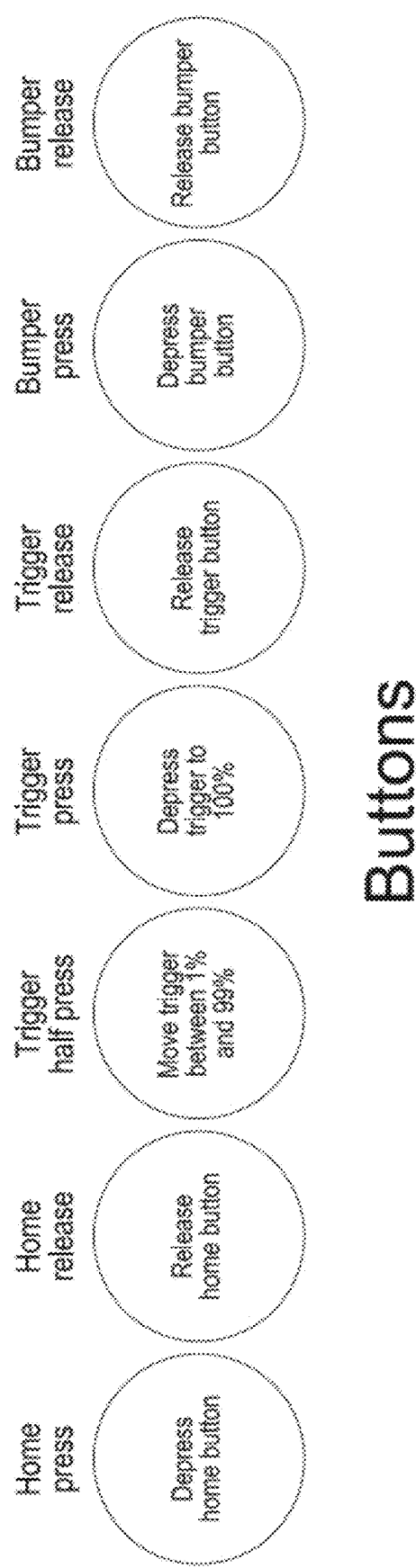
FIG. 10A illustrates examples of user inputs received through controller buttons.
Figure 10A:
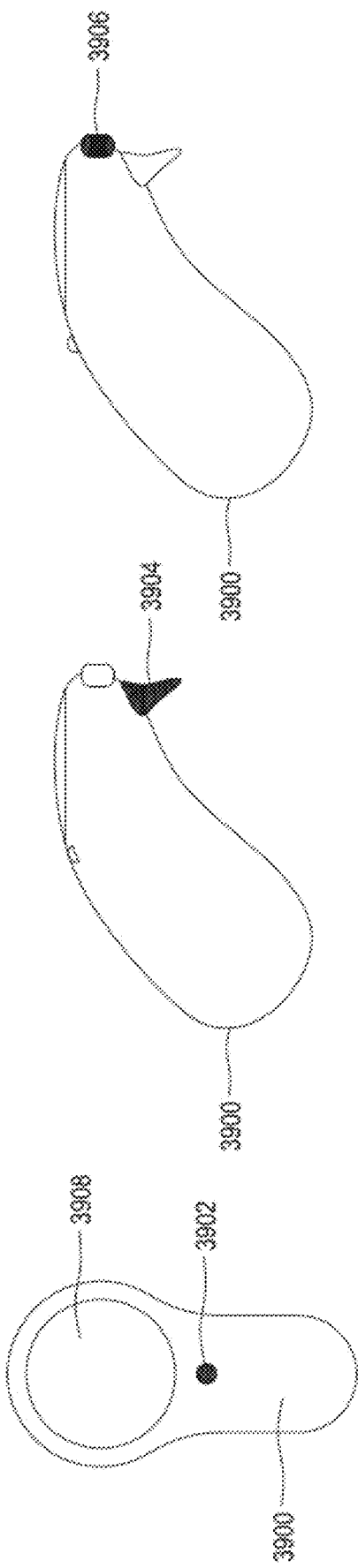
Figure 10B:
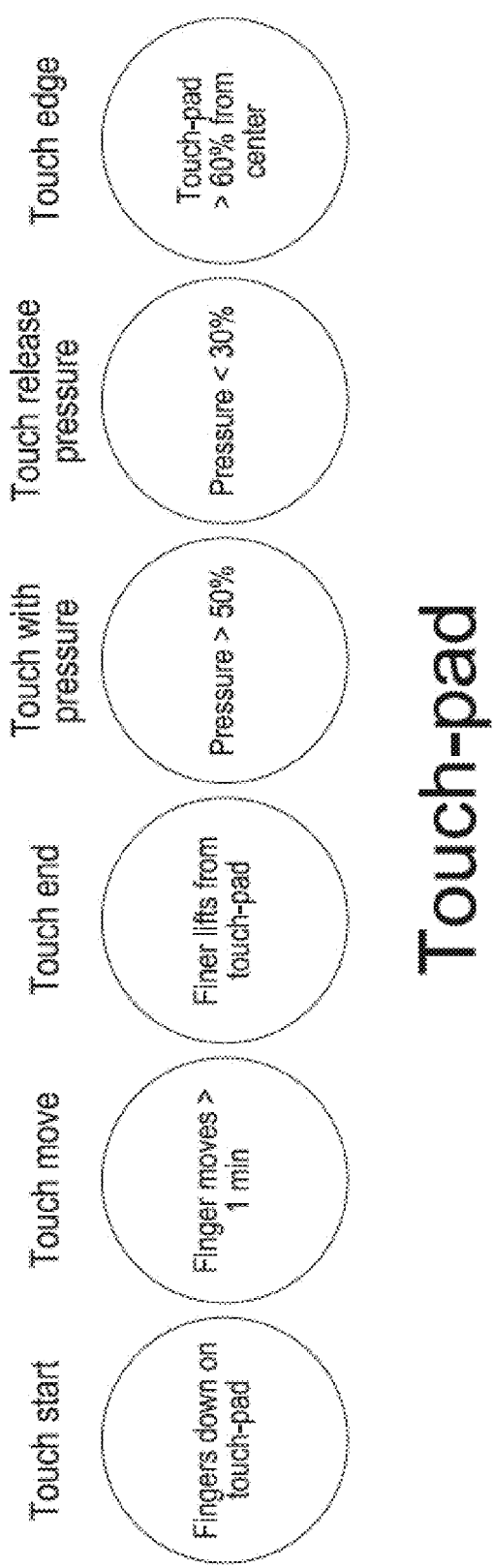
FIG. 10B illustrates examples of user inputs received through a controller touchpad.
Figure 10B:
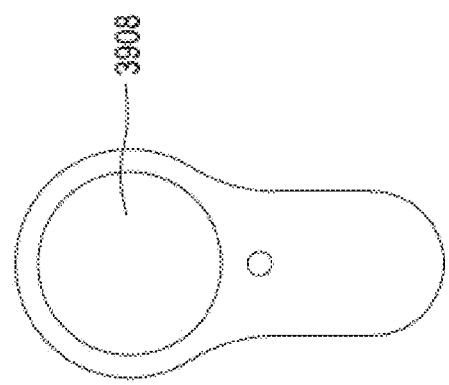

FIGS. 10A and 10B illustrate examples of user inputs received through controller buttons or input regions on a user input device. In particular, FIGS. 10A and 10B illustrates a controller 3900, which may be a part of the wearable system disclosed herein and which may include a home button 3902, trigger 3904, bumper 3906, and touchpad 3908. The user input device or a totem can serve as controller(s) 3900 in various embodiments of wearable systems.

Potential user inputs that can be received through controller 3900 include, but are not limited to, pressing and releasing the home button 3902; half and full (and other partial) pressing of the trigger 3904; releasing the trigger 3904; pressing and releasing the bumper 3906; touching, moving while touching, releasing a touch, increasing or decreasing pressure on a touch, touching a specific portion such as an edge of the touchpad 3908, or making a gesture on the touchpad 3908 (e.g., by drawing a shape with the thumb).

FIGS. 10A and 10B illustrate various examples of user inputs that may be received and recognized by the system. The user inputs may be received over one or more modes of user input (individually, or in combination, as illustrated). The user inputs may include inputs through controller buttons such as home button 3902, trigger 3904, bumper 3906, and touchpad 3908; physical movement of controller 3900 or HMD 3910; eye gaze direction; head pose direction; gestures; voice inputs; etc.

As shown in FIG. 10A a short press and release of the home button 3902 may indicate a home tap action, whereas a long press of the home button 3902 may indicate a home press & hold action. Similarly, a short press and release of the trigger 3904 or bumper 3906 may indicate a trigger tap action or a bumper tap action, respectively; while a long press of the trigger 3904 or bumper 3906 may indicate a trigger press & hold action or a bumper press & hold action, respectively.

As shown in FIG. 10B, a touch of the touchpad 3908 that moves over the touchpad may indicate a touch drag action. A short touch and release of the touchpad 3908, where the touch doesn't move substantially, may indicate a light tap action. If such a short touch and release of touchpad 3908 is done with more than some threshold level of force (which may be a predetermined threshold, a dynamically determined threshold, a learned threshold, or some combination thereof), the input may indicate a force tap input. A touch of the touchpad 3908 with more than the threshold level of force may indicate a force press action, while a long touch with such force may indicate a force press and hold input. A touch near the edge of the touchpad 3908 may indicate an edge press action. In some embodiments, an edge press action may also involve an edge touch of more than a threshold level of pressure. FIG. 10B also shows that a touch on touchpad 3908 that moves in an arc may indicate a touch circle action.

FIG. 10C illustrates examples of user inputs received through physical movement of a controller or a head-mounted device (HMD). As shown in FIG. 10C, physical movement of controller 3900 and of a head mounted display 3910 (HMD) may form user inputs into the system. The HMD 3910 can comprise the head-worn components 70, 110 shown in FIG. 9D. In some embodiments, the controller 3900 provides three degree-of-freedom (3 DOF) input, by recognizing rotation of controller 3900 in any direction. In other embodiments, the controller 3900 provides six degree-of-freedom (6 DOF) input, by also recognizing translation of the controller in any direction. In still other embodiments, the controller 3900 may provide less than 6 DOF or less than 3 DOF input. Similarly, the head mounted display 3910 may recognize and receive 3 DOF, 6 DOF, less than 6 DOF, or less than 3 DOF input.

FIG. 10D illustrates examples of how user inputs may have different durations. As shown in FIG. 10D, certain user inputs may have a short duration (e.g., a duration of less than a fraction of a second, such as 0.25 seconds) or may have a long duration (e.g., a duration of more than a fraction of a second, such as more than 0.25 seconds). In at least some embodiments, the duration of an input may itself be recognized and utilized by the system as an input. Short and long duration inputs can be treated differently by the wearable system. For example, a short duration input may represent selection of an object, whereas a long duration input may represent activation of the object (e.g., causing execution of an app associated with the object).

Figure 11A:
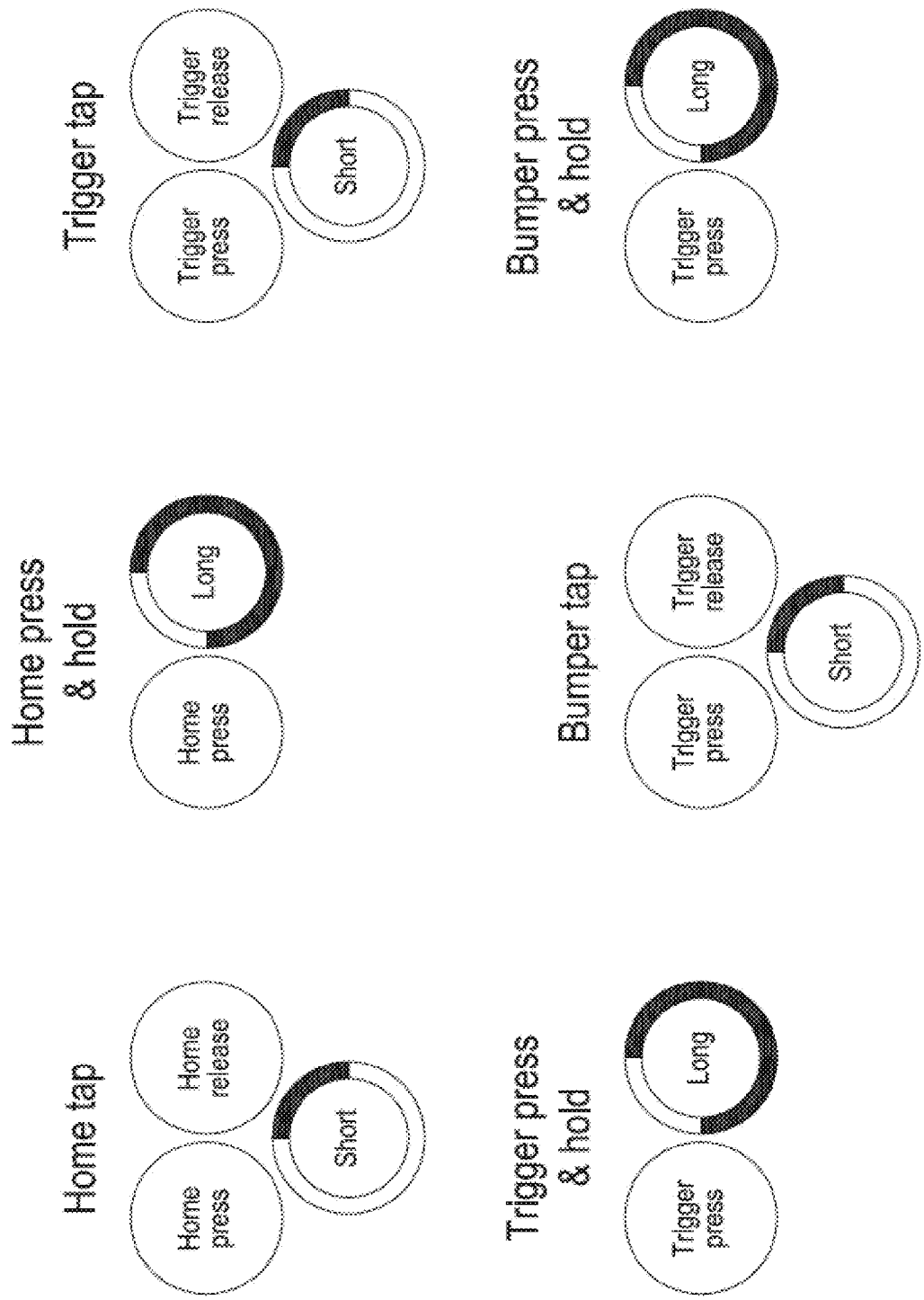
FIG. 11A illustrates additional examples of user inputs received through controller buttons.
Figure 11B:
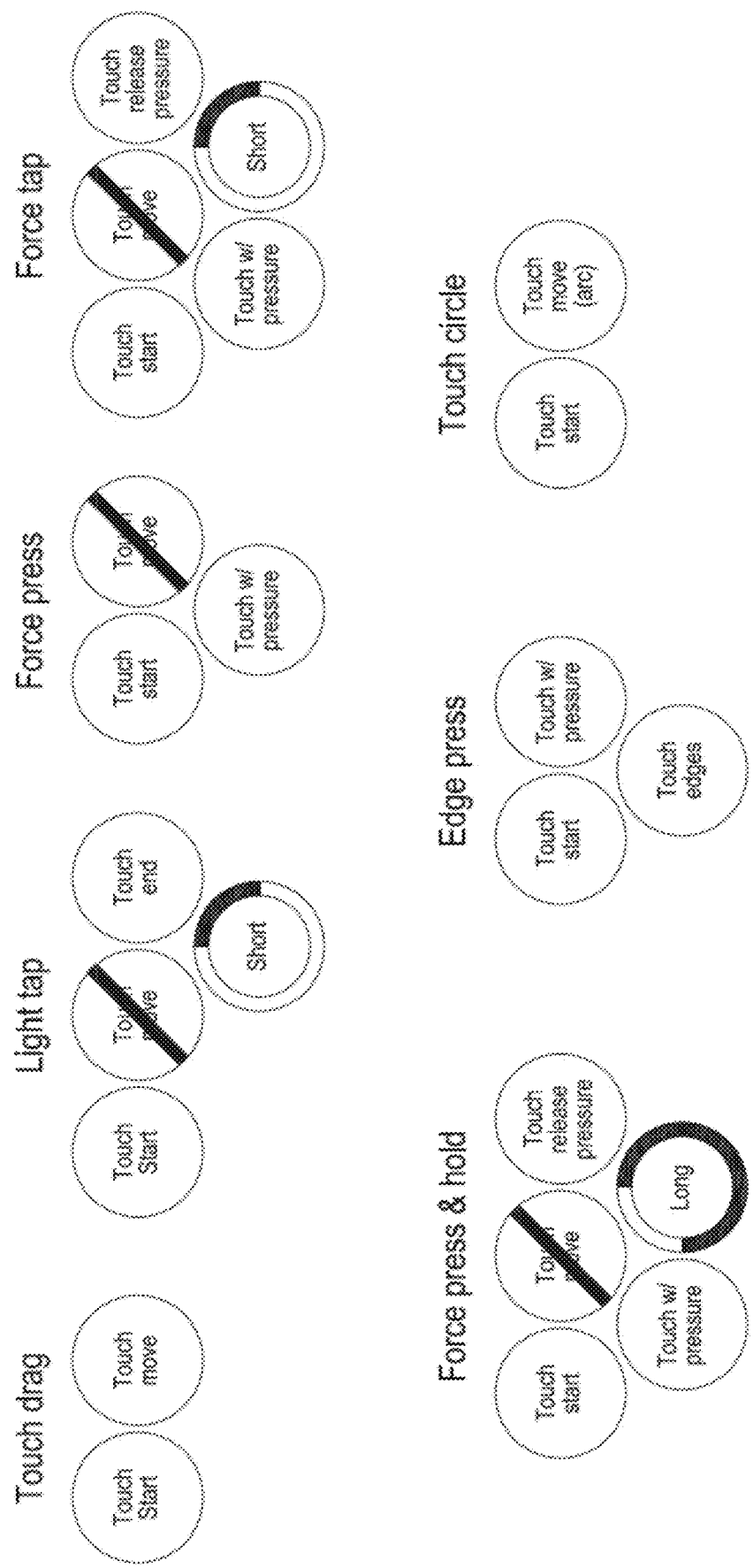
FIG. 11B illustrates additional examples of user inputs received through a controller touchpad.

FIGS. 11A and 11B illustrate various examples of user inputs that may be received and recognized by the system. The user inputs may be received over one or more modes of user input (individually, or in combination, as illustrated). The user inputs may include inputs through controller buttons such as home button 3902, trigger 3904, bumper 3906, and touchpad 3908; physical movement of controller 3900 or HMD 3910; eye gaze direction; head pose direction; gestures; voice inputs; etc.

As shown in FIG. 11A a short press and release of the home button 3902 may indicate a home tap action, whereas a long press of the home button 3902 may indicate a home press & hold action. Similarly, a short press and release of the trigger 3904 or bumper 3906 may indicate a trigger tap action or a bumper tap action, respectively; while a long press of the trigger 3904 or bumper 3906 may indicate a trigger press & hold action or a bumper press & hold action, respectively.

As shown in FIG. 11B, a touch of the touchpad 3908 that moves over the touchpad may indicate a touch drag action. A short touch and release of the touchpad 3908, where the touch doesn't move substantially, may indicate a light tap action. If such a short touch and release of touchpad 3908 is done with more than some threshold level of force (which may be a predetermined threshold, a dynamically determined threshold, a learned threshold, or some combination thereof), the input may indicate a force tap input. A touch of the touchpad 3908 with more than the threshold level of force may indicate a force press action, while a long touch with such force may indicate a force press and hold input. A touch near the edge of the touchpad 3908 may indicate an edge press action. In some embodiments, an edge press action may also involve an edge touch of more than a threshold level of pressure. FIG. 11B also shows that a touch on touchpad 3908 that moves in an arc may indicate a touch circle action.

Other example user input can include an input device (e.g., a user's hand) or mechanism, which may have six degrees of freedom. Advantageously, using a user's hand as input can improve a user experience by allowing a user to make intuitive pointing or other input gestures to provide information to the AR system. In the case of object interaction and control, the use of a user's hand or other pointing device can help a user more intuitively accommodate both targeting components of an object and moving the object based on the position or orientation of the user's hand (or other pointing device). Thus, discrete button activations may not be needed. However, in some examples, a combination of discrete button activations and pointing with a six degree of freedom input device may be used.

D. Single Controller Content Movement and Interaction

Some applications implemented by an augmented reality (AR) or virtual reality (VR) system may include interactable and/or movable virtual content that accepts user input, through for example, user head pose, body pose, eye gaze, controller input, the like or a combination thereof. For example, an application may have a virtual control menu in which a user can select, highlight, or otherwise interact with the menu or information associated with the menu. In another example, an application may have a web browser in which a user can input information within a browser window or control information using interactive features, such as a refresh, home, or control button. An application may also allow the interactable virtual content to move within the user's environment as the user moves around their environment or by active input of the user. However, it can be difficult and clumsy for a user to both interact with content and move the content within their environment using the sometimes limited controls provided by a VR or AR system. For example, if a user wants to interact with the interactable content, they may provide one set of inputs and if a user wants to move the interactable content, they may provide a second set of inputs. Combining the two sets of inputs can be clumsy and uncomfortable for a user. Described herein are systems and methods to simplify movement of and/or interaction with interactable virtual content so as to make it less burdensome to interact with the interactable virtual content.

One way to facilitate user interaction and movement of content in the user's environment is to separate the actions of interaction (e.g., within a user interface) and movement (e.g., of the user interface). For example, an AR system may place the content at a fixed location within the user's environment and then accept input from the user to interact with the placed content based on user gestures, a controller, user gaze, the like, or some combination thereof. However, placing an interactive space (e.g., a prism that includes a bounded volume of interactive content) at a set location within the user's environment is not always ideal in the context of virtual or augmented reality. For example, in a virtual or augmented reality experience, a user may move around their 3D environment. If the interactive space is pinned at a set location, then the user would have to return to the location of the interactive space in order to input information.

Another way to facilitate user interaction and movement of content is to utilize separate controllers for interaction and movement. For example, an AR system could have a controller for each hand of the user. A first controller in the user's first hand could move the interactive space in the user's 3D environment and the second controller in the user's second hand could select content within the interactive space. However, such use of two controllers results in an awkward and uncomfortable user experience, in part, because it requires ambidextrous motions that users are often not accustomed to.

Disclosed herein are systems and methods for an interaction and movement mechanic that allows both content placement and interaction using a single controller. The interaction and movement mechanic can allow for different magnitudes of movement by a controller to affect different aspects of the input to the system. For examples, small movements within an interactive content object (of, for example, a six degree of freedom pointing device) can be used to target or select content within the interactive content object. Larger movements outside of the interactive content object can cause the interactive content object's position to follow (or update/respond to) the controlling device. Advantageously, such a system can allow a user to both bring content with them as they move about their 3D environment and selectively interact with that content using the same controller.

In general, the systems and methods described herein allow the user to move a cursor or pointer (e.g., responsive to movement of a handheld controller) within an interactive content object, such as within a prism, to interact with the interactive content object. Once the user moves the cursor or pointer outside of the interactive content object (or outside some additional boundary area surrounding the interactive content object), the functionality of the controller movement is updated to move the position of the interactive content object to correspond with movement of the controller, rather than to attempt to interact with content of the interactive content object. Thus, functionality of the controller may be alternated by the user providing movements of the controller. Depending on the embodiment, the threshold movement of the controller may be defined by a position of the controller pose with reference to a plane of the interactive content object and/or an angle between the controller pose and the plane of the interactive content object.

Figure 12A:
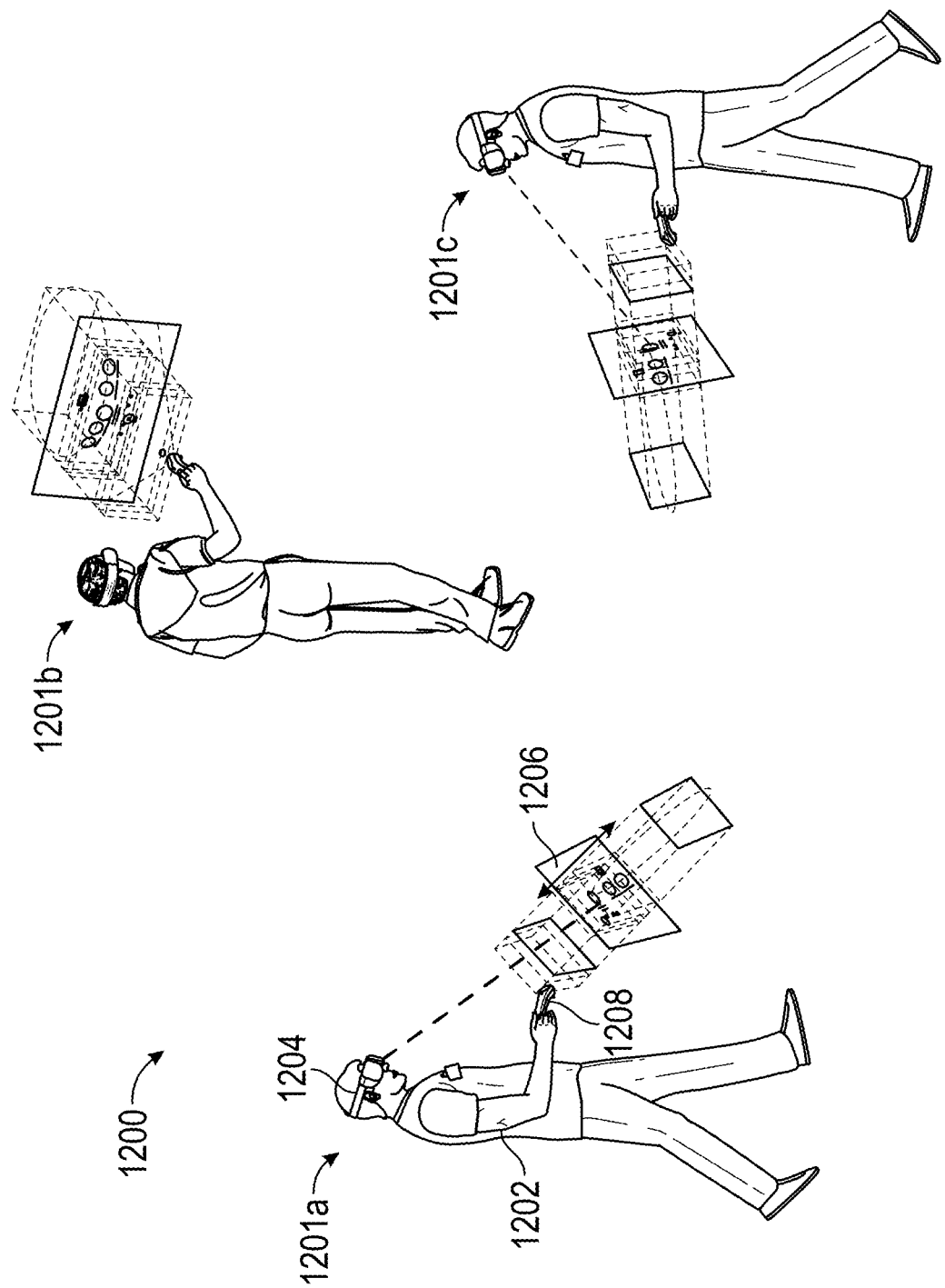
FIG. 12A illustrates an example content control environment 1200 according to one example of a follow and interaction method disclosed herein.

FIG. 12A illustrates an example content control environment 1200 according to one example of a follow and interaction process disclosed herein. For example, a user 1202 may use a wearable device 1204 (such as a head mounted display disclosed above with reference to FIG. 9D) that can allow the user to perceive virtual content in their 3D environment. The wearable device 1204 may display virtual content 1206 at a location in front of the user. The location in front of the user may be determined by a position and/or orientation of a controller 1208 of the wearable device (such as a user's hand or the controller described with reference to FIGS. 10A-11B). As described in further detail below, if the user moves the controller 1208 so that a pointing vector of the controller does not intersect a bounded area or volume 1212 associated with the content 1206, then the wearable device 1204 may update the location of the content 1206 towards the new point of focus of the controller. If the user moves the controller 1208 so that the pointing vector of the controller intersects the bounded area or volume 1212, then the wearable device 1204 may allow the user to select and input information associated with the content 1206 without moving the content 1206. Advantageously, as the content 1206 moves in conjunction with the head pose, an orientation of the content 1206 may be adjusted to match a current head pose of the user 1202. Thus, no matter where the content 1206 is placed in the 3D environment of the user, the content is angled for convenient viewing at the user's current head pose. For example, in some implementations the content 1206 may be oriented perpendicular to the head pose direction 1210.

Advantageously, as the user moves around their environment, the follow and interaction processes disclosed herein can allow content to move and reorient with the user from location to location. For example, as illustrated in FIG. 12A, a user may have a first orientation and location 1201*a*. The user may move to a new location 1201*b* or 1201*c* and have a new orientation. By tracking the user's head pose and pointing vector associated with the controller 1208 as the user moves and reorients themselves, the AR system may move the location and orientation of the content 1206 and effectively follow the user to the new location 1201*b* or 1201*c*. However, where the user makes smaller adjustments to the position and orientation of the controller 1206, the AR system may maintain the location of the content 1206 and allow the user to provide input or interact with the content via those smaller movements of the controller 1206.

Figure 12B:
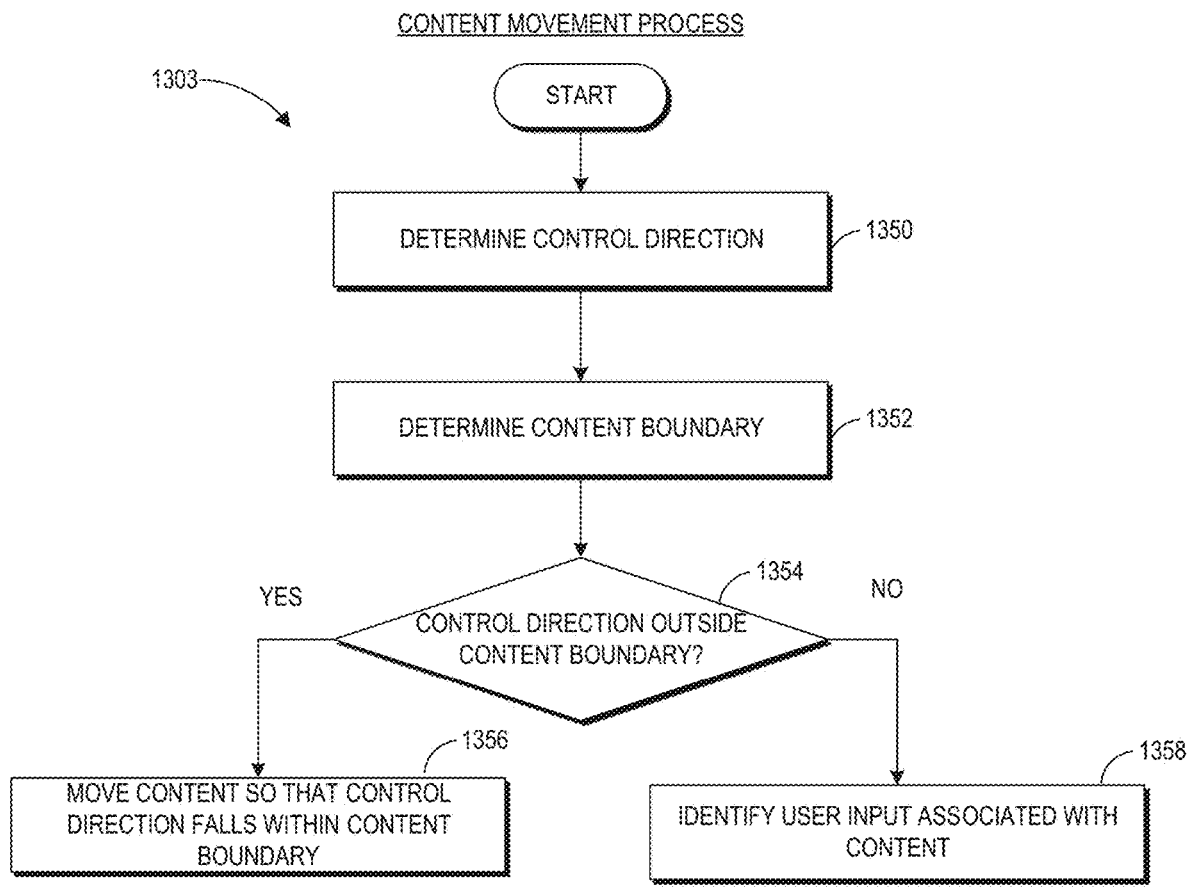
FIG. 12B shows a flowchart of an example process that may be utilized to control content location in the user's 3D space or interact with the content.

FIG. 12B shows a flowchart of an example process 1303 that may be utilized to control whether movements of the controller are used to update location of the content in the user's 3D space or to allow the user to interact with the content. A process 1303 can include some combination of a direction determination block 1350, a content boundary determination block 1352, boundary comparison block 1354, a content movement block 1356, and an input identification block 1358, or fewer or more blocks.

At a direction determination block 1350, the AR system may determine a pointing vector of a controller, device, gesture, or other input mechanism capable of indicating a direction. A pointing vector can include a direction within the 3D environment of the user that is indicated by one or more input devices, whether the input device is electromechanical (e.g., a totem or handheld controller), mechanical, or an object (e.g., a user's hand, finger, or pencil). In some examples, the pointing vector can include an indicated direction by one or more user gestures. In some examples, the pointing vector can include an indicated direction of a handheld controller, such as described above with reference to FIGS. 10A-11B. In some examples, a pointing vector may be determined by more than one input, such as a controller orientation and user eye gaze or other combination of inputs.

At a content boundary determination block 1352, the AR system may determine a boundary of virtual content. The boundary may be one or more edges of a volume of space associated with virtual content, some subset of the volume of space (e.g., if the virtual content is very large), or an area that includes some space around a border of the virtual content. In some examples, the content boundary may be associated with more than one piece of virtual content.

The content boundary may be of any shape. For example, the content boundary may be a rectangular prism, sphere, truncated cone, or other shape. In some embodiments, the content boundary may or may not have a shape similar to that of the virtual content. For example, if the content is a rectangular menu, the content boundary can be rectangular. If the content is circular, the content boundary can be circular or rectangular. In some examples, the content boundary may be of the same or similar bounds of the virtual content. For example, the virtual content may be a prism around a rectangular interactive menu. The prism may have a rectangular prism having a length and height equal to or greater than the interactive menu. In some embodiments, a content boundary may be the edges of the rectangular prism.

Additionally or alternatively, the content boundary may be the same in a horizontal and vertical direction or may be different. For example, the content boundary may be further away from the edges of the virtual content in the vertical direction than in the horizontal direction. Thus, the content may move more with less change in direction by the controller in the vertical direction than in the horizontal direction.

The content boundary may be smaller or larger than the bounds of the virtual content or prism containing the virtual content. For example, the content boundary may coincide with the bounds of an interactive portion of the virtual content (e.g., a menu tile) that may be smaller than the full size of the virtual content. In some examples, the size or shape of the content boundary may vary based on one or more aspects of the content and/or AR system. For example, the content boundary may be different for different types of virtual content or applications associated with the virtual content. In some embodiments, the content boundary can extend to include a portion or percentage of the user's Field of View. In some examples, the content boundary may be a rectangular cuboid having a ⅓ meter, ½ meter, a meter, or other value. In other examples, the boundary may be 10%, 25%, or other amount of the user's field of view. In some examples, the virtual content may be sized or adjusted to fit within the set threshold or boundary.

Figure 12C:
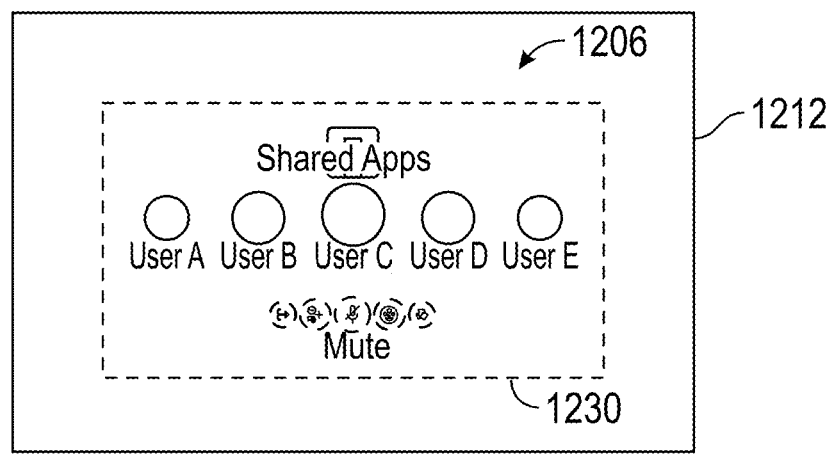
FIG. 12C illustrates example content within a bounded volume.
Figure 12D:
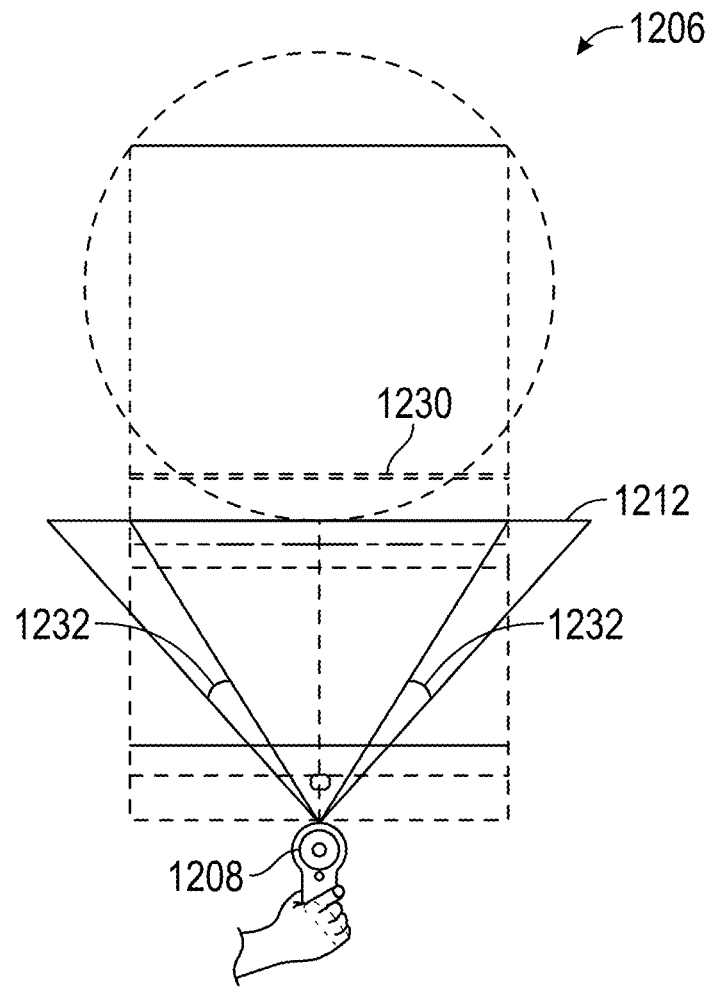
FIG. 12D illustrates a top view of a controller oriented such that its pointing vector is generally towards the content within a bounded volume.

FIG. 12C illustrates example content 1206 within a bounded volume 1212 and FIG. 12D illustrates a top view of a controller 1208 oriented such that its pointing vector is generally towards the content 1206 within a bounded volume 1212. In this example, the bounded volume 1212 is larger than the area 1230 of content 1206. Advantageously, this extra area allows for a padding in which a user may change the direction of the pointing vector of the controller 1208 to outside the immediate area 1230 of the content 1206 without triggering content movement (e.g., without causing the content to follow movement of the controller). This extra area can be defined by an angular distance 1232 from the edges of the content area 1230. The angular distance 1232 can be any number of degrees, such as 5 degrees, 10 degrees, or 20 degrees. The angular distance 1232 may be different at different edges of the area 1230 of the content 1206. For example, the angular distance 1232 can be greater at a left or right edge than at a top or bottom edge of the content area 1230. In another example, the angular distance 1232 can be different based on the content 1206. For example, the content 1206 may be a menu having more interactive content on the left side over the right side. Since a user interacting with content is more likely to move the pointing vector towards the side with more interactive content, the AR system may provide a greater padding on the left side to help avoid accidental movement of the content 1206 to a new location and make it easier for the user to interact with the content 1206.

With continued reference to FIG. 12B, at a boundary comparison block 1354, the AR system may determine whether the pointing vector of the controller intersects the content boundary. For example, the pointing vector of the controller may pass within the content boundary or outside the content boundary. If the pointing vector intersects the content boundary, then the AR system may move to block 1358. If the pointing vector does not intersect the content boundary, then the AR system may move to block 1356.

At a content movement block 1356, the AR system may move the virtual content to a new location. For example, the AR system may move the content towards a pointing vector of the controller. The point may be determined based on one or more factors associated with the AR system or application, such as described in further detail below. The AR system may move the content so that the pointing vector just begins intersecting with the content boundary or may move the content so that the pointing vector intersects a particular point within the content, such as the center of the content.

The AR system may move the content at a constant or variable speed. For example, the AR system may move the content at a speed calculated based on the distance between the current content location and the desired content location. In some examples, the speed may be faster for a further distance and slower for a smaller distance. In some examples, the speed may be variable. For example, the content may move slowly at first, speeds up, and then slows down closer to the destination.

At an input identification block 1358, the AR system may receive user input associated with the content. For example, the user may indicate with the controller (and/or gesture, voice command, or the like) interactions with interactive content (rather than continued movement of the interactive content in relation to controller movements). The AR system may receive the indication and perform actions based on the indication. For example, the content can include a virtual menu having selectable buttons. The AR system may receive an indication from the user to select one or more of the selectable buttons and perform one or more actions based on the selection.

E. Example Content Follow Movement

Figure 13A:
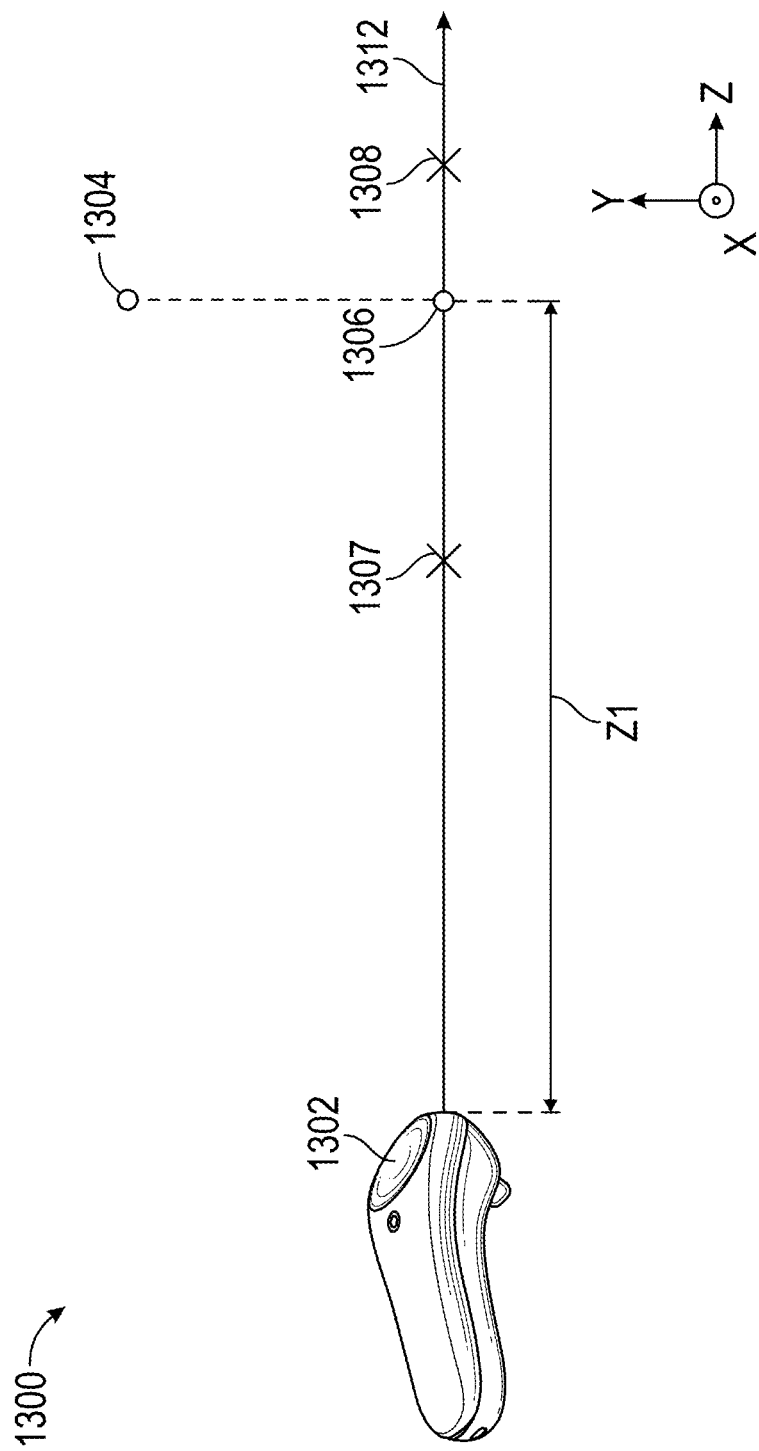
FIGS. 13A, 13B and 13C illustrate example aspects of an example content movement environment.
Figure 13B:
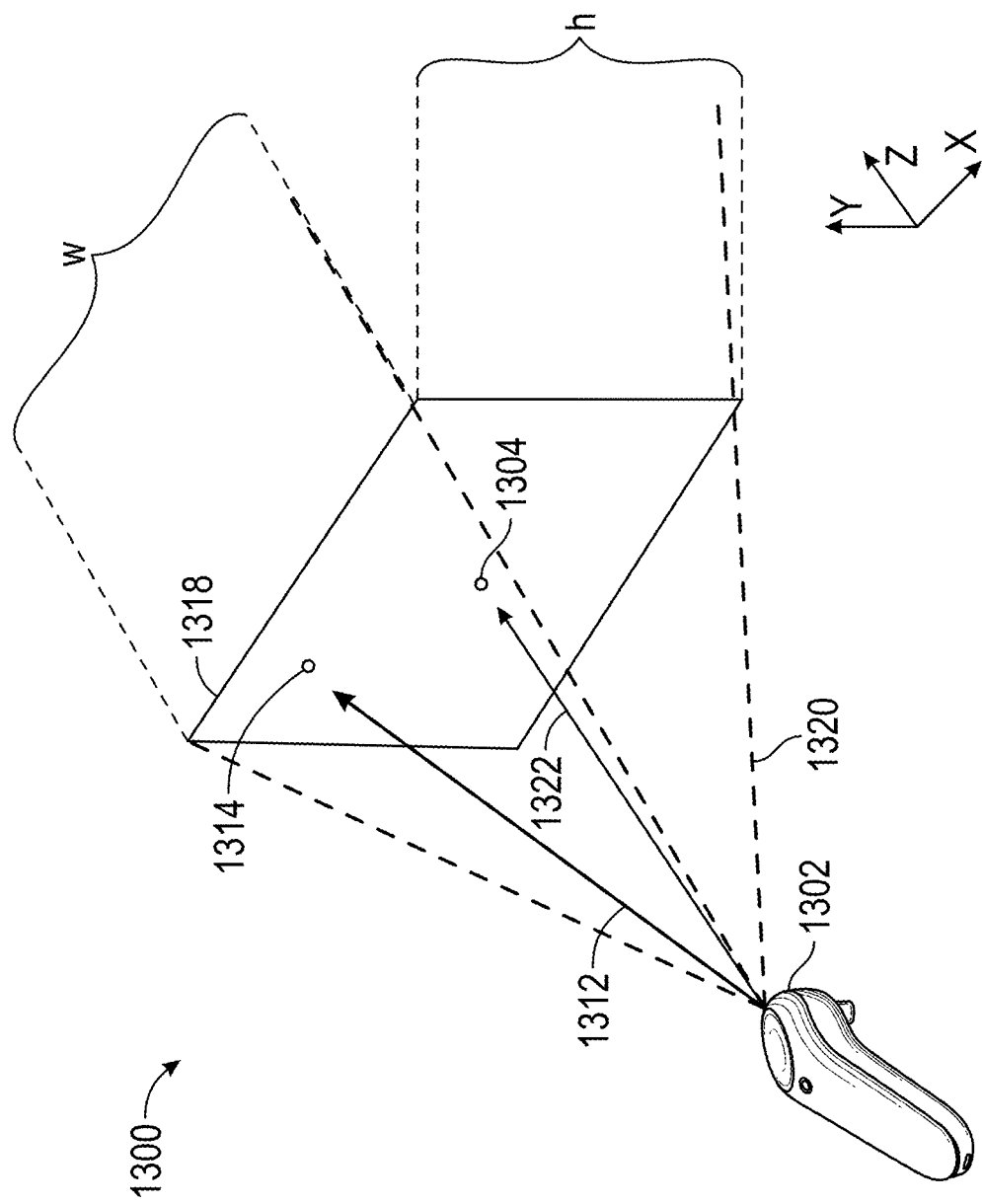
Figure 13C:
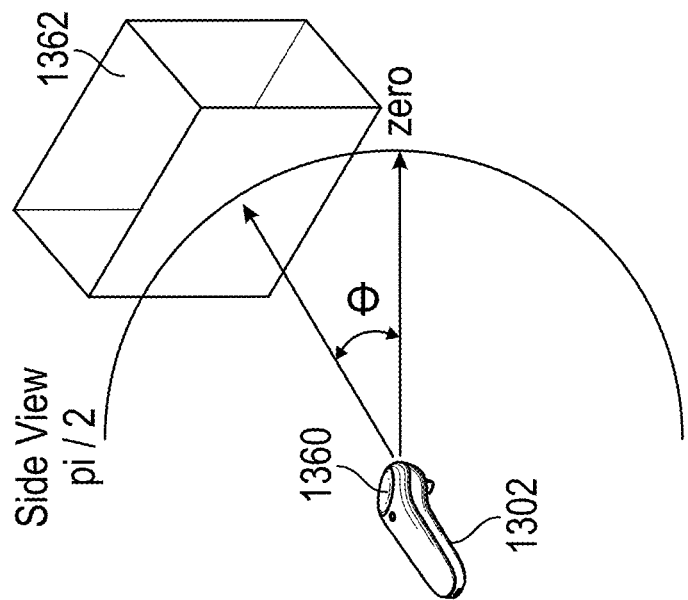
Figure 13C:
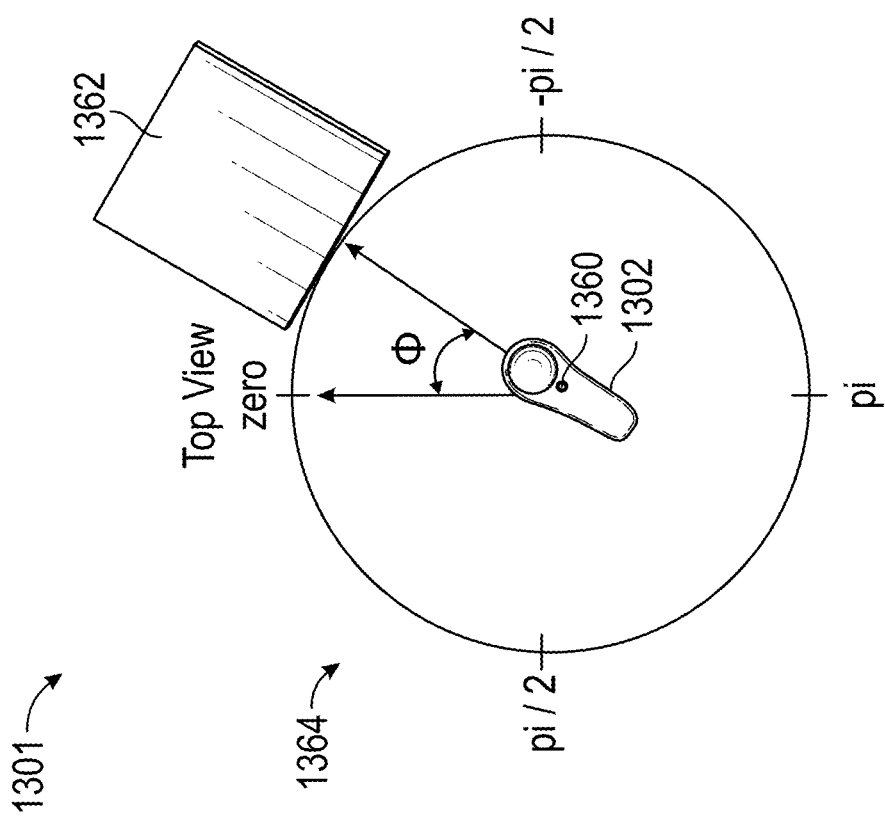

As mentioned above, an AR system may control the movement of virtual content within a 3D environment through the manipulation of a controller, resulting in the content effectively following the user as the user moves around their space. FIGS. 13A, 13B, and 13C illustrate example aspects of example content movement environments that may include moving virtual content at a content location 1304 with a controller 1302.

A controller 1302 can be any multiple degree of freedom input device. For example the controller 1302 can include a user's hand or portion thereof, a controller of a wearable device, such as described above with reference to FIGS. 10A-11B, a six degree of freedom device capable of providing a pointing direction, a three degree of freedom touch input device, the like, or some combination thereof. A controller 1302 may have some combination of sensors, controls, or output components that allow the controller 1302 to indicate a direction. In some examples, the indicated direction may coincide with a direction parallel to an axis of the controller 1302. In some examples, a controller 1302 may indicate a direction using an orientation or positioning of the controller 1302. The indicated direction may then define the direction of a pointing vector of the controller 1302.

Virtual content can include one or more prisms, which generally describes a three-dimensional container, area, or volume associated with mixed reality content, which may contain multiple virtual content items, such as representations of 3D objects. As illustrated in FIG. 13B, a prism can include a bounded volume 1318 that may have a width w and a height h and another dimension. Content bounded in the prism may be controlled or placed in the user's environment by controlling or placing the prism in which the content is bounded. A virtual object, as used herein, may be or include a prism. Various characteristics, uses, and implementations of prisms are described in U.S. Patent Publication No. 2019/0197785, published Jun. 27, 2019, which is hereby incorporated by reference herein in its entirety. In one example, content within the prism may include a menu associated with an application. For example, the virtual content can include a control menu capable of accepting user input through input at one or more locations within the menu.

The virtual content may be centered at a location 1304 within the 3D environment of the user. The location 1304 may be based on one or more factors associated with the user, the wearable device, or the user's environment. For example, the location 1304 can be relative to the location of the controller 1302. The controller 1302 may define a coordinate system with a point of origin at a point on the controller 1302. In cases where the location 1304 is relative to a controller 1302 or other point of reference, the location 1304 can fall within a range of distances to the point of origin associated with the controller 1302 or other point of reference along the pointing vector 1312. For example, a vector 1322, such as illustrated in FIG. 13B, may be defined from the point of origin of the controller 1302 to a content location (or reference point associated with the content), and the location 1304 may be along the vector 1322.

With reference to FIG. 13A, in determining a content location 1304, an AR system may calculate or determine a location 1306 of the content along a pointing vector 1312 of the controller 1302. For example, the AR system may define a coordinate system having a point of origin at the controller 1302. The coordinate system may have a z axis parallel to pointing vector 1312 of the controller 1302. The content location 1304 can be defined within a coordinate system of the controller 1302. As such, the content location 1304 may have a z component (such as z1 as illustrated in FIG. 13A). The z component may correspond to the content location 1306 along the pointing vector 1312 of the controller 1302. If the z component falls below a minimum distance 1307, then the AR system may move the content from location 1304 along pointing vector 1312 until the z component is greater than or equal to the minimum distance. If the z component falls above a maximum distance 1308, then the AR system may move the content from location 1304 along the pointing vector 1312 until the z component is less than or equal to the maximum distance.

A content location 1304 may additionally have a point of reference with respect to the width w and height h of bounded volume 1318. A pointing vector 1312 of the controller 1302 may intersect with the bounded volume 1318 having a height h and width w at a point of intersection 1314. If a location of point 1314 falls outside the width, w, of the bounded volume 1318, then the AR system may move the content from location 1304 horizontally until the distance is within bounds. If the vertical distance exceeds the bounding height, h, of the bounded volume 1318, the AR system may move the content from location 1304 vertically until the distance is within bounds. As such, if the controller 1302 rotates or moves horizontally or vertically within the bounded volume 1318, the location 1304 of the bounded volume 1318 may stay relatively fixed in space. However, if the controller 1302 moves horizontally or vertically outside the bounded volume 1318, the AR system may move the virtual content and/or bounded volume 1318 to a new location in space 1314.

FIG. 13C illustrates another example content movement environment 1301. In this example content movement environment 1301, an AR system may maintain the content 1362 between a minimum and maximum distance away from a controller 1302. For example, if the distance between the content 1362 and the controller 1302 is less than the minimum, then the AR system may set the distance to the minimum. Additionally or alternatively, if the distance between the content 1262 and the controller 1302 is greater than the maximum, then the AR system may set the distance to the maximum distance. Otherwise, the AR system may maintain the current distance between the content 1362 and the controller 1302, making no adjustments.

Additionally or alternatively, a user's ability to easily locate and interact with the content 1362 may be improved if the content 1362 remains in front of the controller 1302, e.g., so the controller points to a spot inside the bounds of the content 1362. To help achieve the maintained distance and allow the user to point to a spot inside the content 1362 or prism, the AR system may move the content (e.g., a prism or other three-dimensional content item) on the surface of an invisible sphere 1364.

With reference to FIG. 13C, an invisible sphere 1364 may have a center 1360 at a point 1360 on the controller 1302 (or some other point on the controller). The AR system may convert the location of the content 1362 into spherical coordinates having an origin at the point 1360. The spherical coordinates may include a distance, an azimuthal angle φ (e.g., rotation in the horizontal plane) and a polar angle θ (e.g., similar to pitch). In other embodiments, another coordinate system may be used.

As with the discussion above, the content 1362 (e.g., a prism or other three-dimensional content) may have a set of bounds. The set of bounds may also be associated with spherical coordinates with reference to the designated center 1360. In this example, the AR system may determine the outer surface of the sphere 1364 with reference to the bounds of the content 1362 (e.g., so the bounds of the content are maintained adjacent a surface of the sphere 1364). In one particular example, the spherical coordinates are determined, with C representing the controller location and P representing the content (e.g., prism) location so that: a vector, CP, from the controller 1302 to the content 1362 is defined as:

$$CP = P - C$$

where the distance between the controller 1302 and the content 1362 is the length of CP, an azimuth of the vector is the arctangent of CP·z/CP·x, a horizontal distance of CP is the distance of the vector projected onto the X-Z plane, which may be calculated as hypot(CP,x, CP·y), and an altitude of the content location is the arctangent of the height/horizontal distance or arctan(CP·y/horizontal distance). In some embodiments, the location of the content 1362 may be an anchor associated with the prism, such as a point at the center of the prism's volume or a point at the center (or other location) of one of the sides of the prism, for example that may indicate a location where the prism and hence the content can be attached to other real or virtual objects, such as walls, table, chair, or the like.

Advantageously, in some embodiments, as the controller is moved, the position of the content 1362 is adjusted to remain on the outer surface of the sphere 1364. For example, if a current azimuth and polar angle of the controller pointing vector falls inside the bounded area of the sphere, then the AR system may maintain the position of the content 1362. If a current azimuth and/or polar angle of the pointing vector falls outside the bounded area of the sphere, then the AR system may update the position of the content 1362. For example, the AR system may determine a difference in azimuth between the nearest point on the bounded area and the current azimuth of CP. The AR system may then move the content 1362 to reduce the difference. Additionally or alternatively, the AR system may adjust the altitude of the content to reduce a difference in altitude of the content location and CP.

In one particular example, a position of content 1360 may be adjusted for distance (e.g., as noted above with reference to a minimum and maximum distance), and with reference to azimuth and altitude. To determine if the azimuth angle of the content needs to be adjusted, the horizontal bounds may be converted to an angle, e.g., the arctangent of half the horizontal bounds divided by the distance: arctan((horiz_bounds/2)/distance). If the difference in azimuth is greater than this angle, then the AR system may reduce the difference in azimuth to this angle. To determine if the altitude angle of the content needs to be adjusted, the vertical bounds may be converted to an angle, e.g. the arctangent of half the vertical bounds divided by the distance: arctan((vert_bounds/2)/distance). If the difference in altitude is greater than this angle, then the AR system may reduce the difference in altitude to this angle.

In some examples, the AR system may transfer the coordinates of the content 1360 into Cartesian coordinates. Previously, the spherical coordinates of the content were in reference to the controller. Advantageously, using Cartesian coordinates can allow the AR system to position the content within the environment of the user without reference to the controller 1302. To convert to Cartesian (rectangular) coordinates from spherical coordinates, the AR system may apply the following formulas:

$$X = \text{distance} * \cos(\text{azimuth}) * \cos(\text{altitude})$$

$$Y = \text{distance} * \sin(\text{altitude})$$

$$Z = \text{distance} * \sin(\text{azimuth}) * \cos(\text{altitude})$$

Where X corresponds to an x coordinate, Y corresponds to a y coordinate in a Cartesian coordinate frame, and Z corresponds to a z coordinate in a Cartesian coordinate frame.

F. Example Content Orientation

Figure 14A:
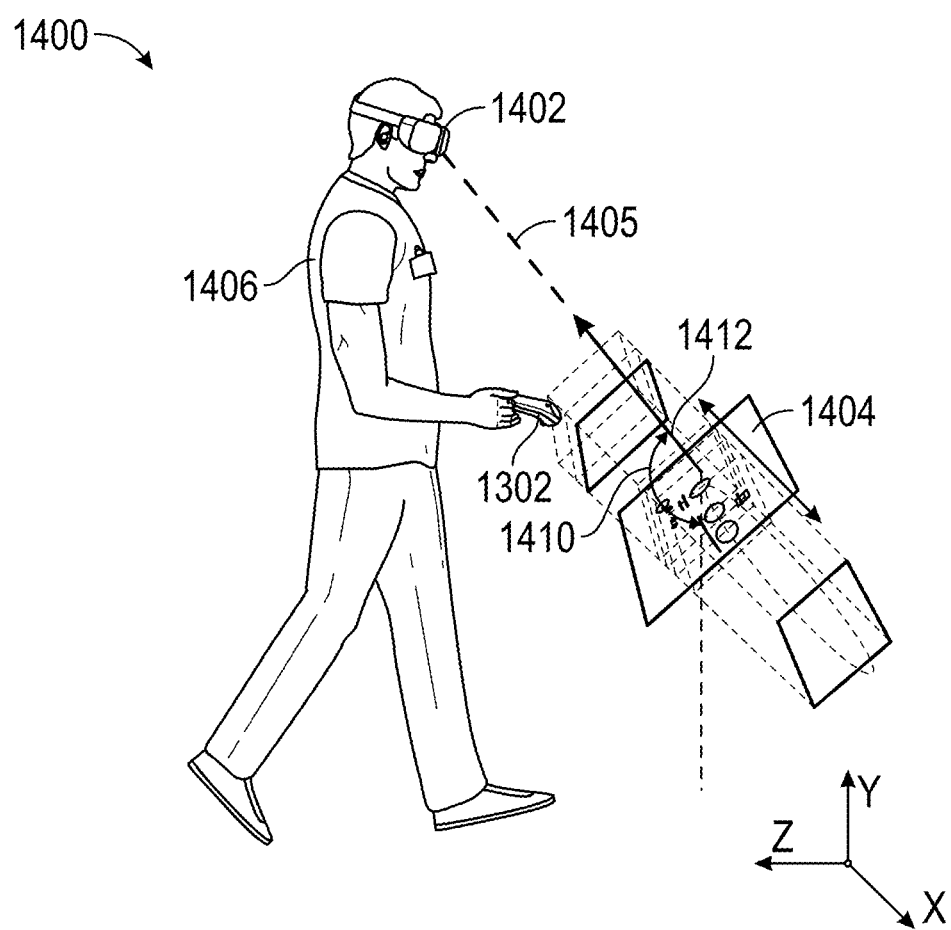
FIGS. 14A-14C illustrate aspects of an example content orientation environment.
Figure 14B:
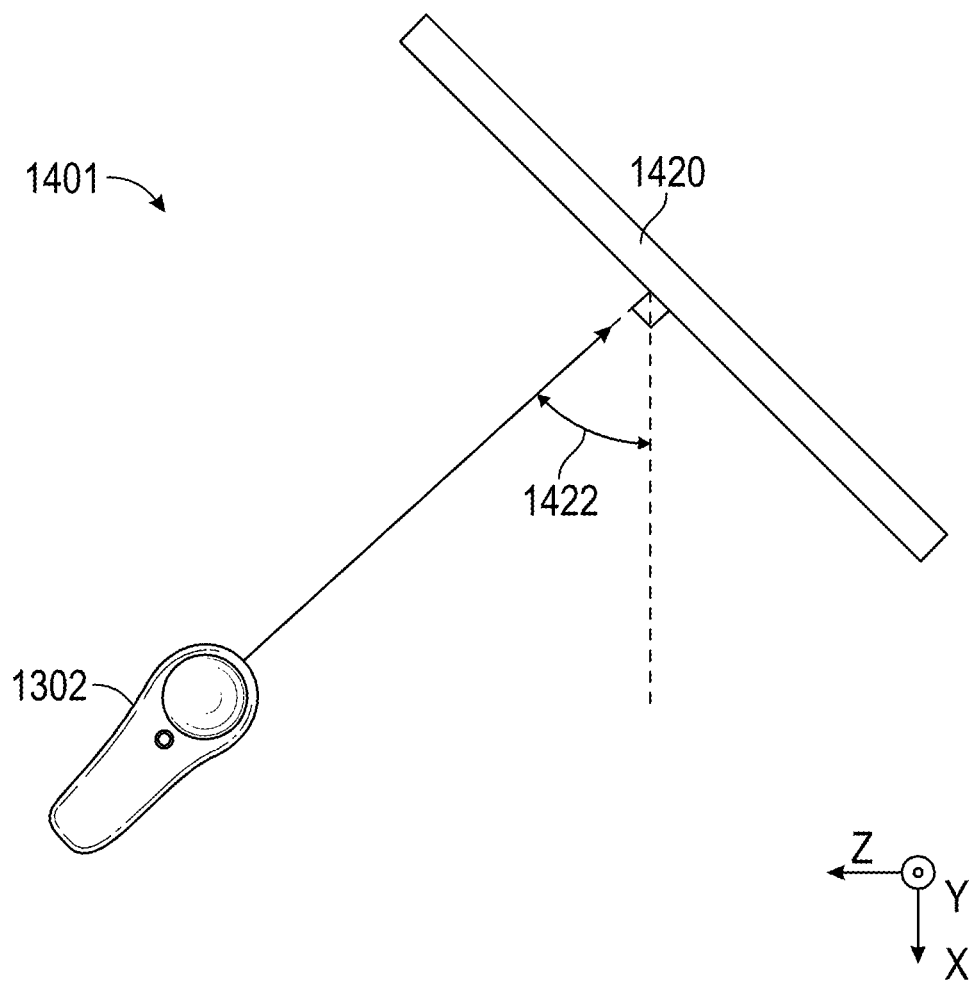
Figure 14C:
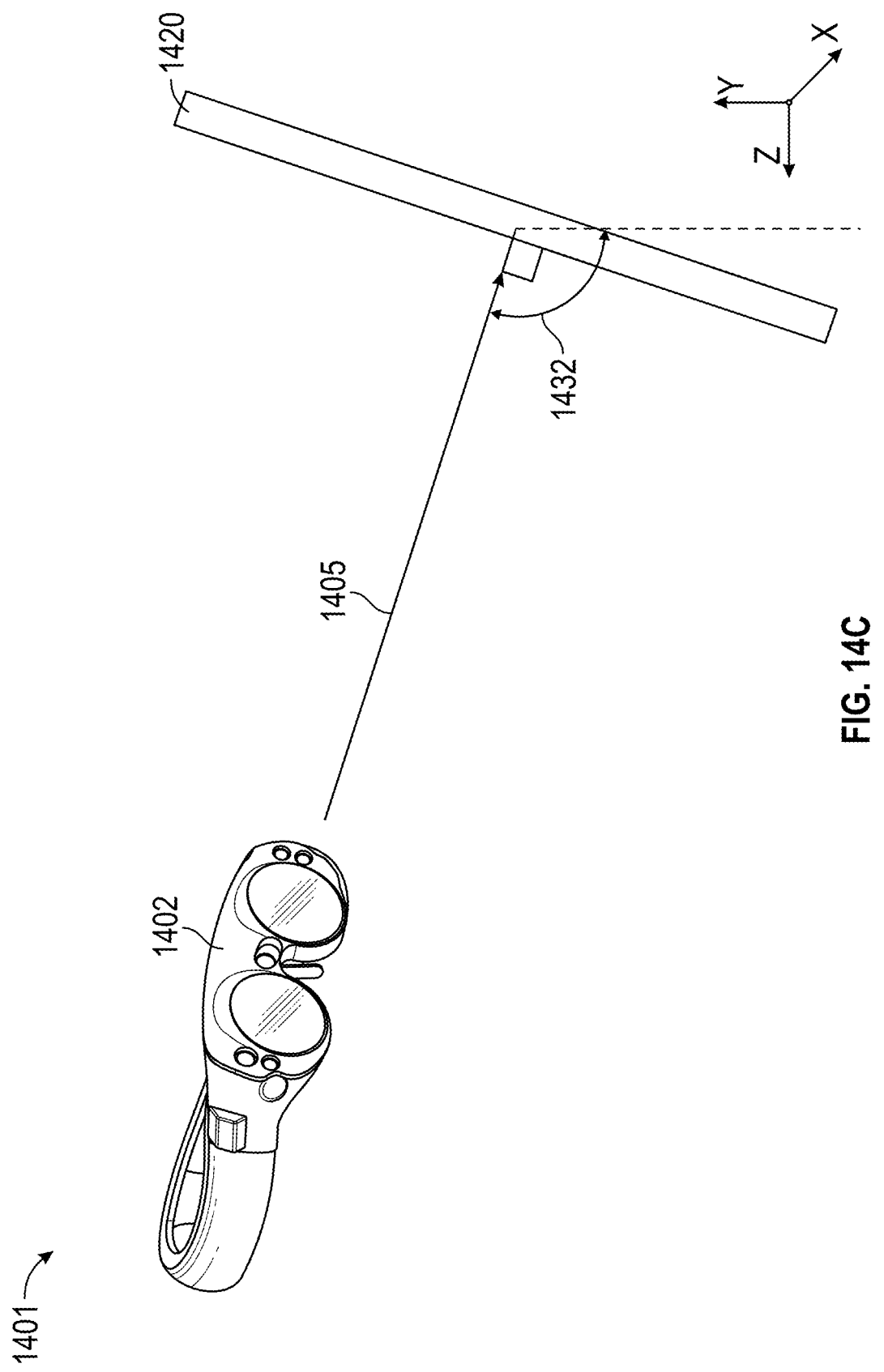

An AR system may be capable of controlling the orientation of virtual content within the 3D environment of the user. FIGS. 14A-14C illustrate aspects of an example content orientation environment 1400 for controlling the orientation of virtual content 1404 that includes a controller 1302 and head mounted device 1402.

With reference to FIG. 14A, a content orientation environment 1400 can include a user 1406 wearing a head mounted display 1402 and/or using a controller 1302 to manipulate and/or view virtual content 1404. The user may view the virtual content 1404 at a location 1412 in the 3D environment of the user 1406. The content may be displayed at an angle 1410 with respect to a gaze vector 1405 associated with the user's head pose. In some examples, the angle 1410 may be optimized so that the user can more easily perceive a surface of the content 1404. In some examples, the angle 1410 may be such that a surface of the content 1404 is perpendicular to the gaze direction of the user.

FIG. 14B illustrates a top-down view of an example content orientation environment 1401. As shown in FIG. 14B, the content 1420 may be rotated so that it faces (e.g., remains perpendicular to a controller pose of) the controller 1302. Thus, the surface of the content 1420 facing the head mounted display 1402 may be rotated to an angle 1422 with respect to an x axis of a coordinate system centered at the head mounted display of the user. The angle 1422 may be updated as the controller moves so that the surface 1420 of the content remains locked in a perpendicular angle to a pointing vector of the controller 1302. In another example, the angle 1422 may be updated upon user or application input.

FIG. 14C illustrates a side view of the example content orientation environment 1401. As shown in FIG. 14C, the content 1420 may be rotated so that it faces the head of the user or head-mounted display 1402. Thus, the surface of the content 1420 facing the head mounted display 1402 or head of the user may be rotated to an angle 1432 with respect to a y axis of a coordinate system centered at the head mounted display of the user. The angle 1432 may be updated as the user moves their head, eye gaze, and/or head mounted display so that the surface of the content 1420 remains locked in a perpendicular angle to a gaze vector 1405 associated with the user's head pose. In another example, the angle 1432 may be updated upon user or application input. In some examples, the angle 1432 may be based on the height of the content 1420 such that surface of the content 1420 may be oriented to face an origin point associated with the user, such as a point on the user's head. In another example, the angle 1432 and/or height of the content 1420 may be fixed.

Figure 14D:
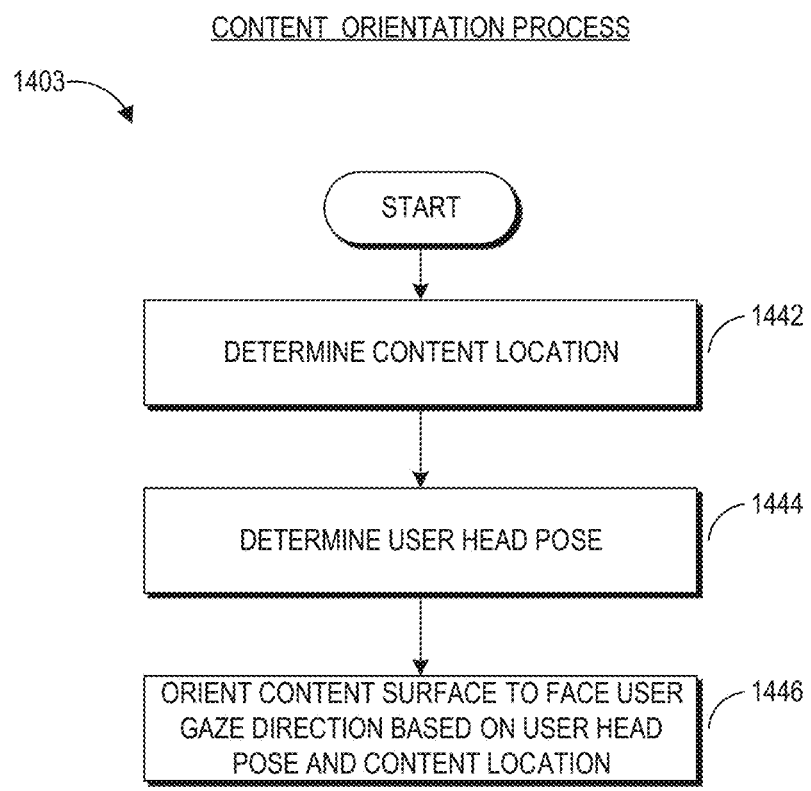
FIG. 14D illustrates a flow chart of an example content orientation process.

FIG. 14D illustrates a flow chart of an example content orientation process 1403. For example, a content orientation process 1403 can include a content location determination block 1442, a head pose determination block 1444, a content orientation block, or more or fewer blocks.

At a content location determination block 1442, the AR system may determine the location of virtual content within the 3D environment of the user. For example, the virtual content may be located at a point in front of the user (such as at a location determined by movement rules described with reference to FIGS. 12A-13B). The AR system may determine the content location based on input from or data associated with the virtual content, application, and/or AR system.

At a head pose determination block 1444, the AR system may determine the head pose of the user. For example, the AR system may detect one or more parameters associated with the head pose of the user using one or more sensors associated with the AR system, such as one or more outward-facing cameras associated with a head-mounted display worn by the user, an inertial measurement unit, some combination thereof or other sensors. The head pose of the user may be utilized to help determine a gaze direction of the user.

At a content orientation block 1446, the AR system may utilize the content location and gaze direction of the user to reorient the virtual content. For example, the AR system may orient a surface of the content while at the determined content location to be perpendicular to the gaze direction of the user. In some examples, the AR system may additionally move the location of the content so as to accomplish a comfortable viewing experience of the user in viewing the content at the updated orientation.

G. Example Content Control Mechanics

Figure 15:
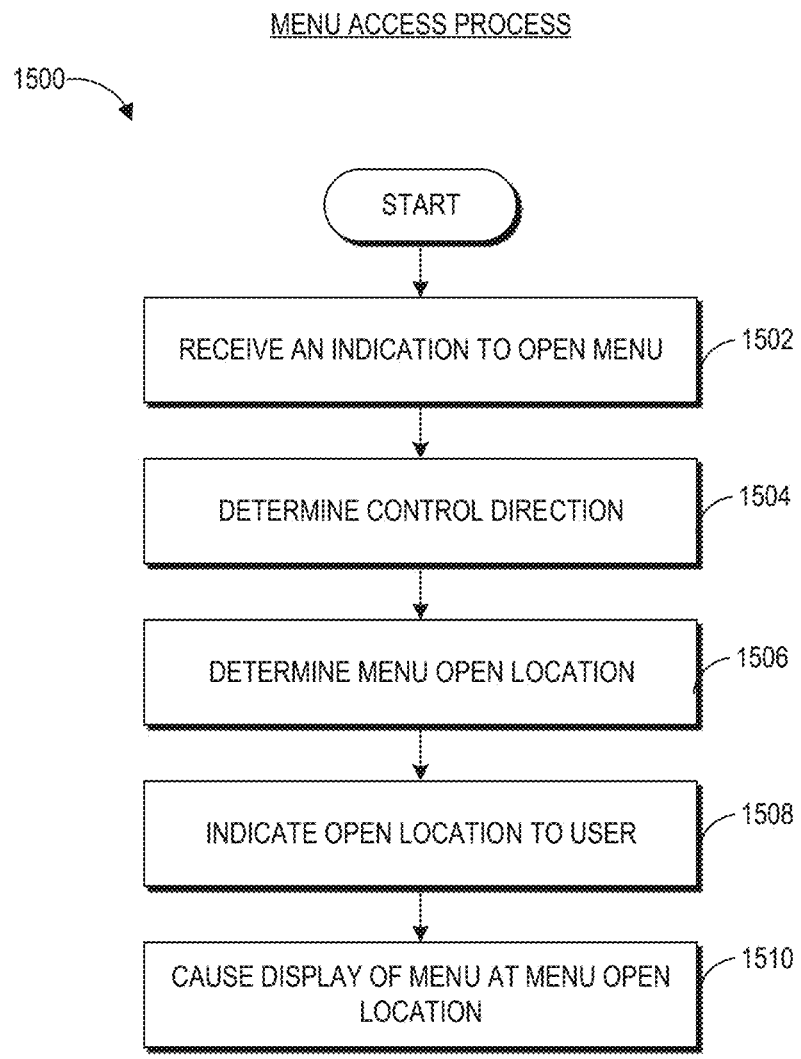
FIG. 15 illustrates an example content access mechanic.
Figure 16:
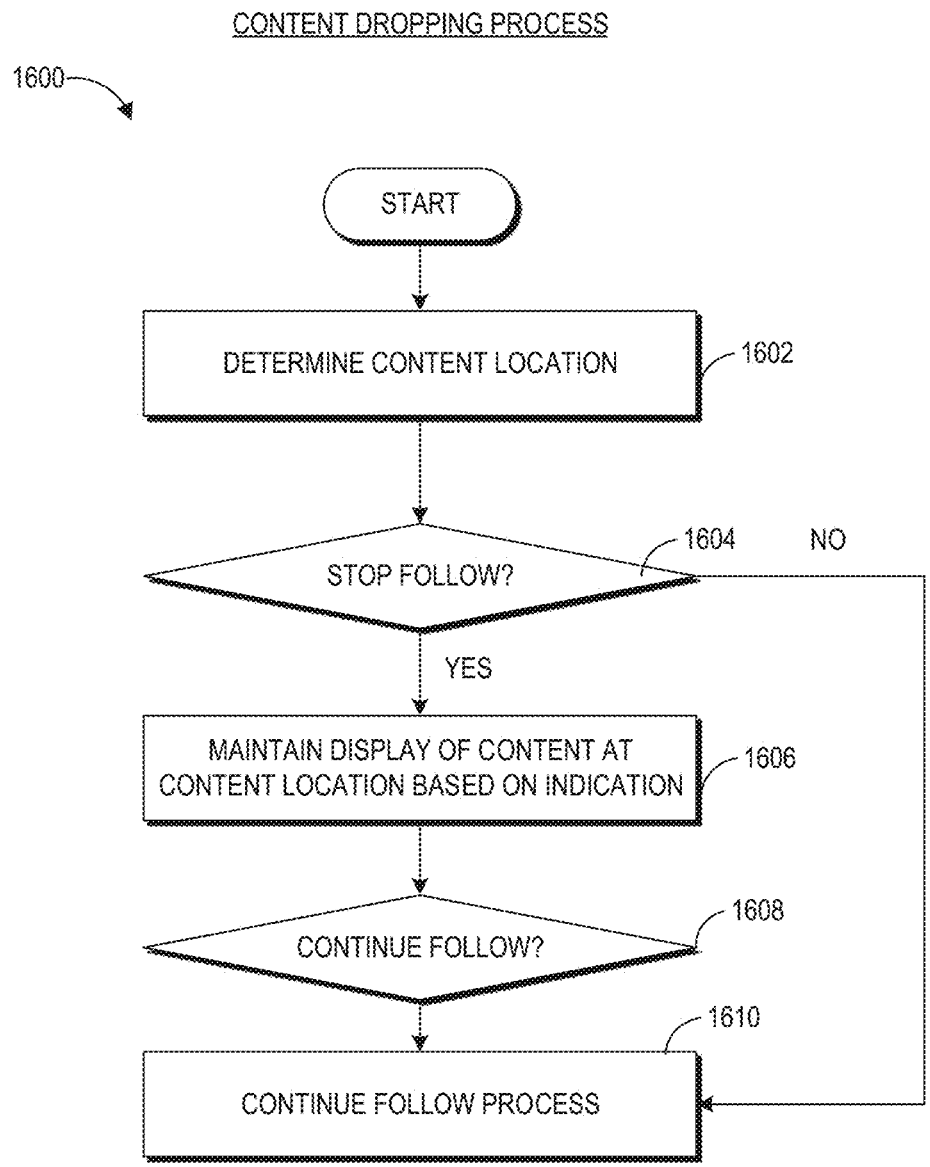
FIG. 16 illustrates an example content drop mechanic.

FIG. 15 illustrates an example content access mechanic and FIG. 16 illustrates an example content drop mechanic that may be utilized in conjunction with the interaction and movement mechanic described above.

1. Menu Open and Close

In some examples, content may include a control menu. FIG. 15 illustrates an example menu access process 1500 for accessing a control menu. With reference to FIG. 15, a menu access process 1500 can include an indication block 1502, a direction determination block 1504, an open location determination block 1506, an animation block 1508, a menu display block 1510, fewer, or more blocks. While the example of FIG. 15 is discussed with reference to a control menu, the process may be used with other content, such as a prism that includes one or more interactive virtual objects.

At an indication block 1502, the AR system may receive an indication to open or access a menu or other content. The indication can include an input, gesture, or pose. For example, the input can include pointing, a press of a button or other input component of a controller associated with the AR system. In another example, the input can include a gesture associated with accessing the menu or other content. In the case of an input that does not involve the direct press of a button or other direct input to a controller, the AR system may perceive the input using one or more sensors associated with the AR system, such as an outward facing imaging system of a head-mounted display. For example, an input can include six degree of freedom pointing by a user's hand or pointing device. In another example, the input can include input to a multiple degree of freedom touchpad. The AR system may then determine whether an indication is given based on gestures, poses, or other indirect or direct input detected by the one or more sensors. In some examples, different inputs may bring up different types of menus or different content. In some examples, different inputs may be used to bring up the same menu or content.

At a direction determination block 1504, the AR system may determine a pointing vector of a controller, device, gesture, or other input mechanism capable of indicating a direction. A pointing vector can include a direction within the 3D environment of the user that is indicated by one or more input devices. In some examples, the pointing vector can include an indicated direction by one or more user gestures with a six degree of freedom input device or the user's hand. In another example, the pointing vector can include an indicated direction by a three degree of freedom touch input. In some examples, the pointing vector can include an indicated direction of a handheld controller, such as described above with reference to FIGS. 10A-11B. In some examples, a pointing vector may be determined by more than one input, such as a controller orientation and user eye gaze or other combination of inputs.

At an open location determination block 1506, the AR system may determine or identify a location to open the indicated menu or otherwise display content within the 3D environment of the user. The location may be based on the determined direction of focus or other input from the user, application, or AR system. For example, the user may point the controller in their environment. The AR system may display the menu or other virtual content at a point along the pointing vector. The point along the pointing vector may be determined based on any number of factors, including but not limited to one or more rules associated with content location, such as discussed with reference to FIGS. 12A-13B. In some examples, the open location may be at a set distance away from the controller along the pointing vector. In another example, the open location may be in the center of the user's field of view.

At an animation block 1508, the AR system may generate animations, sounds, feedback, or other effects to indicate the opening location of the menu or other content to the user. For example, the open location may be at a point along the direction of focus ray. The direction of focus ray may be pointed towards an area of the 3D environment of the user that is not currently being perceived by the user with their head mounted display. In order to draw the attention of the user to the opening location of the menu or other content, the AR system may display an animation, generate haptic feedback, or play sounds indicating the content is going to open at the location. For example, the AR system may display sparks or other content coming out of the controller or other reference point along the direction of focus towards the open location. Thus, the user's gaze or attention may be more likely drawn to the menu or content location.

At a menu display block 1510, the AR system may display the menu at the open location at an orientation comfortable for the user to view the menu or other interactive virtual content. For example, the orientation and/or position of the menu or other content may be displayed and/or updated according to one or more processes described above with reference to FIGS. 12A-14D.

Additionally or alternatively, the AR system may close or cease to display the content or menu based on one or more closing indications. A closing indication can include an input to a controller, gesture, command, other input, or some combination of inputs to cease to display the menu. Upon receipt of a closing indication, the AR system may cease to display the menu or other content.

2. Content Dropping

FIG. 16 illustrates an example menu access process 1600 for stopping and starting a content follow movement, such as described above with reference to FIGS. 12A and 12B. With reference to FIG. 16, a content dropping process 1600 can include a location determination block 1602, a follow decision block 1604, a display block 1606, a follow decision block 1608, and a follow block 1610.

At a location determination block 1602, the AR system can determine a current location of virtual content or menu being manipulated. For example, the virtual content or menu may be moved to a designated location associated with a direction of focus, such as described above with reference to FIGS. 12A-13B. The AR system may determine that updated location or other location associated with the user or the user's 3D environment to identify where content is or should be located. In some examples, the location may be updated as the user walks around a room as the location of the controller and orientation of the direction of focus changes. In some embodiments, the content may be placed at a fixed distance in front of the user.

At a follow decision block 1604, the AR system can determine whether the AR system should continue to update the location of the content. For example, the AR system may identify a stopping condition for continuing to update the location of the content (or follow process or mechanic). A stopping condition can include an indication from the user or other source to stop updating the location of the content. For example, a user can gesture, issue a command, or press a button or other input on a controller to stop the content from following the user. In another example, the AR system may identify that the user has exited a bounded volume or exceeded a threshold follow condition. In some examples, a combination of stopping conditions may be used. If a stopping condition is detected, the AR system may move to block 1606. If a stopping condition is not detected, the AR system may move to block 1610 to continue updating the location of the content (in other words, continue the follow process or mechanic), such as described above with reference to FIGS. 12A-14B.

At a display block 1606, the AR system can display the content at a current or designated location of the 3D environment of the user. For example, if the AR system receives an indication to stop following at block 1604, the AR system may drop the menu or other content at the current location of the menu or content such that the menu or content stays at the last updated location. In some examples, the AR system may continue to update the orientation of the menu or content, such as described above with reference to FIGS. 14A-14B. In some examples, the AR system may also freeze the orientation of the menu or content to a current orientation. In some examples, the AR system may freeze the orientation of the menu or content as a result of detecting a freeze condition, such as a gesture, command, press a button, or otherwise provide input to the AR system to indicate to the AR system to freeze or stop updating an orientation of the content. In some examples, when the AR system receives a stopping condition at a block 1610, the AR system may update the orientation to a fixed or preset orientation and/or height within the 3D environment of the user. For example, the AR system may fix the content at eye height and fix the orientation of the content for a surface of the content to be perpendicular to the floor of the 3D environment of the user such that the user can view the content with ease.

At a follow decision block 1608, the AR system can determine whether the AR system should continue to update the location of the content. For example, the AR system may identify a starting condition for updating the location of the content (or follow process or mechanic). A starting condition can include an indication from the user or other source to start updating the location of the content. For example, a user can gesture, issue a command, press a button or other input to start having the content follow the user. In another example, the AR system may identify that the user has entered a bounded volume or passed a threshold follow condition. In some examples, a combination of starting conditions may be used. If a starting condition is detected, the AR system may move to block 1610 to continue updating the location of the content (in other words, continue the follow process or mechanic), such as described above with reference to FIGS. 12A-14B.

In some examples, when the AR system receives an indication to begin updating the location and/or orientation of the content, the AR system may summon the content to the current location of the user. For example, the AR system may move the current location of the content to a new location closer to the user. In some examples, the new location may be based on the one or more rules regarding location of the content described with reference to FIGS. 12A-14B above. In some examples, the AR system may not update the location and/or orientation of the content to summon the content to the current location of the user until a summon indication is detected. A summon indication can include a gesture, a command, a button press, or other input.

H. Example Application of Content Follow System

Figure 17:
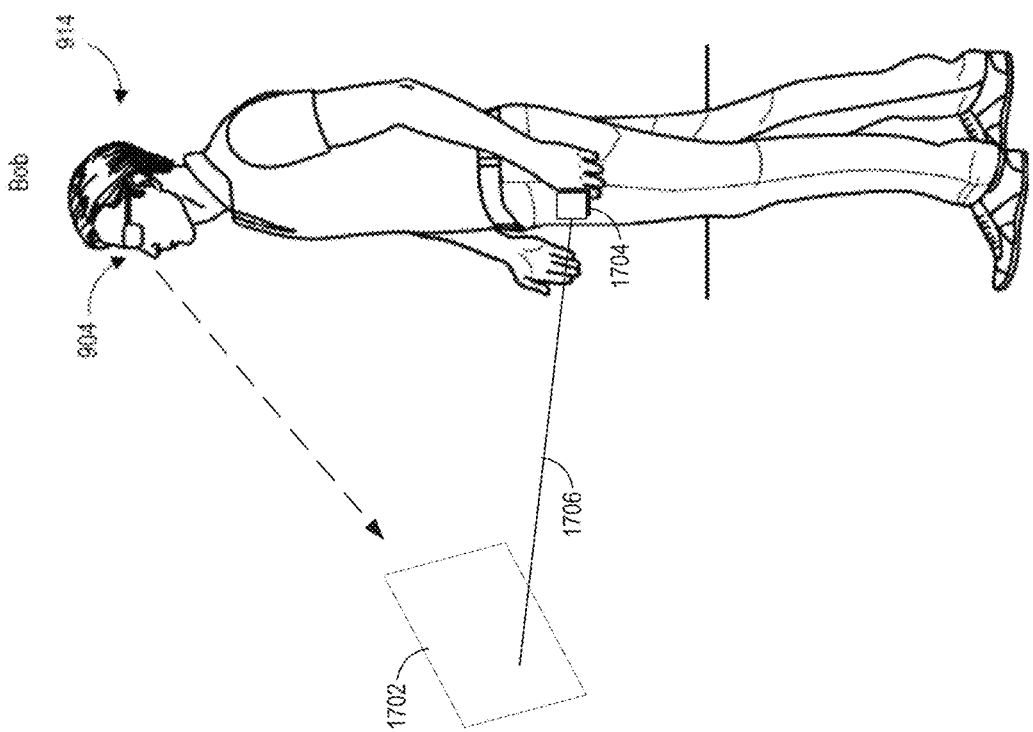
FIG. 17 depicts an example application for a content follow system where two users of respective wearable systems are conducting a telepresence session.
Figure 17:
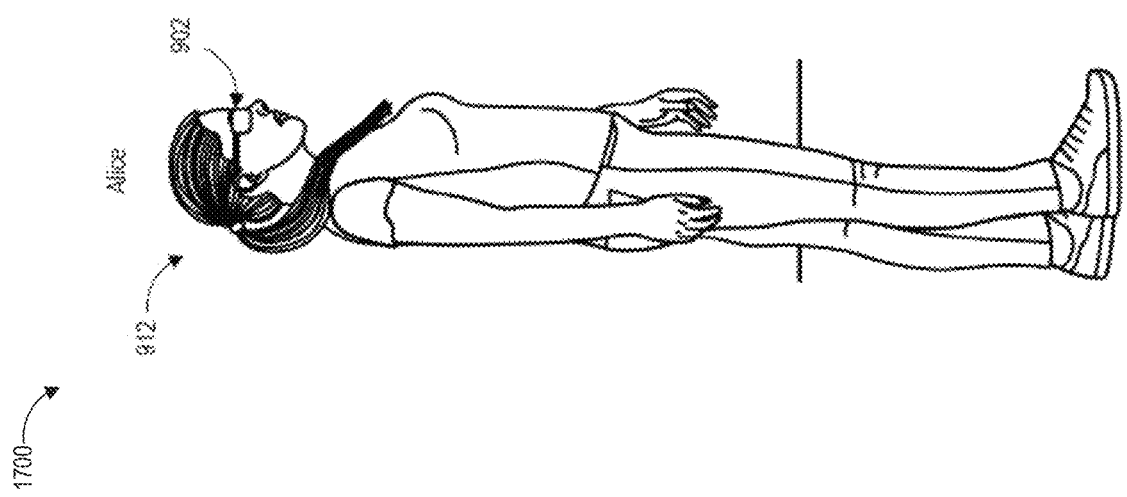

FIG. 17 depicts an example application 1700 for a content follow system where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 9D (e.g., the display device 70 of the system 60) for representing a virtual avatar of the other user in the telepresence session. The two users can conduct a telepresence session using the wearable device. Note that the vertical line in FIG. 17 separating the two users is intended to illustrate that Alice and Bob may (but need not) be in two different locations while they communicate via telepresence (e.g., Alice may be inside her office in Atlanta while Bob is outdoors in Boston).

The wearable devices 902 and 904 may be in communication with each other or with other user devices and computer systems. For example, Alice's wearable device 902 may be in communication with Bob's wearable device 904, e.g., via the network 990. The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice may use other image acquisition and display devices such as a webcam and computer screen while Bob wears the wearable device 904.

Bob may provide an indication through, for example, a button press on a controller 1704, to display a chat menu or other content 1702 during the avatar chat session. Bob's AR system may display the content 1702 according to, for example, the access process 1500 described above with reference to FIG. 15. The content 1702 may appear to Bob at a location along a pointing vector 1706 in Bob's environment. The content 1702 may be oriented to allow Bob to view the content 1702 according to, for example, the orientation process described with reference to FIG. 14D above. The content 1702 may or may not be visible to Alice. In examples where the content 1702 is visible to Alice, the content 1702 may or may not be oriented so that Alice can view the content 1702. As Bob moves around his space during Avatar chat and reorients his controller or head mounted display within the 3D environment, the content 1702 may follow Bob according to one or more processes described above. In some examples, Bob may place the chat menu or other content 1702 at a desired location within Bob's environment. Additionally or alternatively, Bob may select or interact with portions of the content 1702 using smaller movements of the controller 1704. Bob may close the chat menu or other content 1702 through one or more indications to Bob's AR system.

I. Additional Examples

Disclosed herein are additional examples of an AR system. Any of the examples disclosed may be combined.

Example 1: An augmented reality (AR) system comprising:
an AR display configured to present virtual content to a user of the AR system;
an outward facing camera configured to capture one or more images of an environment of the user;
a handheld controller defining a pointing vector indicating a pointing direction of the handheld controller;
a hardware processor in communication with the AR display, the outward facing camera, and the handheld controller, the hardware processor programmed to:
display an interactive content object via the AR display;
in a first interaction mode, while the pointing vector remains within the interactive content object, indicating movements of the handheld controller within the interactive content object and allowing interactions with the interactive content object via the handheld controller;
monitoring changes of the pointing vector with reference to the interactive content object;
in response to detecting movement of the pointing vector outside the interactive content object, updating the system to a second interaction mode wherein the handheld controller causes movement of the interactive content object such that the interactive content object follows movements of the handheld controller in the virtual environment; and
in response to detecting movement of the pointing vector of the handheld controller inside the interactive content object, updating the system to the first interaction mode.

Example 2: The system of Example 1, wherein the interactive content object comprises a prism containing a virtual object.

Example 3: The system of any one of Examples 1 or 2, wherein at least one edge of the interactive content object is 10 degrees further away from the center of the virtual object than a corresponding edge of the virtual object.

Example 4: The system of any one of Examples 1-3, wherein the hardware processor is configured to receive an indication to display the interactive content at a first content location.

Example 5: The system of Example 4, wherein the indication comprises a press and release of a button on the controller.

Example 6: The system of any one of Examples 4-5, wherein the hardware processor is configured to alert the user to the display of interactive content at the first content location.

Example 7: The system of Example 6, wherein the alert comprises at least one of: graphics, haptic feedback, or sounds.

Example 8: The system of any one of Examples 1-7, wherein the hardware processor is configured to receive an indication to stop displaying the interactive content in the environment of the user.

Example 9: The system of Example 8, wherein the indication comprises a press and release of a button on the controller.

Example 10: The system of any one of Examples 1-9, wherein the hardware processor is configured to:
  determine a first user head pose;
  identify a first user gaze vector based on the first user head pose; and
  orient the interactive content so that a surface of the interactive content object is perpendicular to the first user gaze vector.

Example 11: The system of Example 10, wherein the hardware processor is configured to:
  determine a second user head pose;
  identify a second user gaze vector based on the second user head pose; and
  orient the interactive content object so that a surface of the interactive content object is perpendicular to the second user gaze vector.

Example 12: The system of Example 1-11, wherein a pitch of the interactive content object is fixed with respect to a head height of the user.

Example 13: The system of any one of Examples 1-12, wherein the hardware processor is configured to:
  receive an indication to stop moving the interactive content; and
  in response to receiving the indication to stop moving, maintain display of the interactive content at a current content location within the environment of the user.

Example 14: The system of Example 13, wherein the hardware processor is configured to:
  receive an indication to begin moving the interactive content; and
  in response to receiving the indication to begin moving, allow the interactive content to be displayed at a new location within the environment of the user.

Example 15: An augmented reality (AR) system comprising:
  an AR display configured to present virtual content to a user of the AR system;
  a handheld controller having at least six degrees of freedom; and
  a hardware processor in communication with the AR display, the outward facing camera, and the handheld controller, the hardware processor programmed to:
    display interactive content at a first content location;
    determine a first pointing vector comprising a direction indicated by the controller;
    determine whether the first pointing vector intersects with a bounded volume associated with the interactive content;
    in response to determining that the first pointing vector does not intersect the bounded volume, move the interactive content to a second content location associated with a point along the direction of the first pointing vector; and
    in response to determining that the first pointing vector intersects the bounded volume, receive an indication to interact with the interactive content at the first content location.

Example 16: The system of Example 15, wherein the interactive content comprises a prism containing a virtual object.

Example 17: The system of any one of Examples 15 or 16, wherein at least one edge of the interactive content is 10 degrees further away from the center of the virtual object than a corresponding edge of the virtual object.

Example 18: The system of Example 15, wherein the hardware processor is configured to receive an indication to display the interactive content at the first content location.

Example 19: The system of Example 18, wherein the indication comprises a press and release of a button on the controller.

Example 20: The system of any one of Examples 18-19, wherein the hardware processor is configured to alert the user to the display of interactive content at the first content location.

Example 21: The system of Example 20, wherein the alert comprises at least one of: graphics, haptic feedback, or sounds.

Example 22: The system of any one of Examples 15-21, wherein the hardware processor is configured to receive an indication to stop displaying the interactive content in the environment of the user.

Example 23: The system of Example 22, wherein the indication comprises a press and release of a button on the controller.

Example 24: The system of any one of Examples 15-24, wherein the hardware processor is configured to:
  determine a first user head pose;
  identify a first user gaze vector based on the first user head pose; and
  orient the interactive content so that a surface of the interactive content is perpendicular to the first user gaze vector.

Example 25: The system of Example 24, wherein the hardware processor is configured to:
  determine a second user head pose;
  identify a second user gaze vector based on the second user head pose; and
  orient the interactive content so that a surface of the interactive content is perpendicular to the second user gaze vector.

Example 26: The system of any one of Examples 15-25, wherein the first content location and the second content location are at the same height from the ground.

Example 27: The system of Example 26, wherein a pitch of the interactive content is fixed with respect to a head height of the user.

Example 28: The system of any one of Examples 15-27, wherein the hardware processor is configured to:
  receive an indication to stop moving the interactive content; and
  in response to receiving the indication to stop moving, maintain display of the interactive content at a current content location within the environment of the user.

Example 29: The system of Example 28, wherein the hardware processor is configured to:
  receive an indication to begin moving the interactive content; and
  in response to receiving the indication to begin moving, allow the interactive content to be displayed at a new location within the environment of the user.

Example 30: A method for displaying virtual content, the method comprising:
  displaying interactive content at a first content location;
  determining a first pointing vector comprising a direction indicated by a controller;
  determining whether the first pointing vector intersects with a bounded volume associated with the interactive content;
  in response to determining that the first pointing vector does not intersect the bounded volume, moving the interactive content to a second content location associated with a point along the direction of the first pointing vector; and in response to determining that the first pointing vector intersects the bounded volume, receiving an indication to interact with the interactive content at the first content location.

Example 31: The method of Example 30 comprising receiving an indication to display the interactive content at the first content location.

Example 32: The method of Example 31, wherein the indication comprises a press and release of a button on the controller.

Example 33: The method of any one of Examples 31-32 comprising communicating an alert to the user associated with the display of interactive content at the first content location.

Example 34: The method of Example 33, wherein the alert comprises at least one of: graphics, haptic feedback, or sounds.

Example 35: The method of any one of Examples 30-34 comprising receiving an indication to stop displaying the interactive content in the environment of the user.

Example 36: The method of Example 35, wherein the indication comprises a press and release of a button on the controller.

Example 37: The method of any one of Examples 30-36 comprising:
determining a first user head pose;
identifying a first user gaze vector based on the first user head pose; and
orienting the interactive content so that a surface of the interactive content is perpendicular to the first user gaze vector.

Example 38: The method of Example 37 comprising:
determining a second user head pose;
identifying a second user gaze vector based on the second user head pose; and
orienting the interactive content so that a surface of the interactive content is perpendicular to the second user gaze vector.

Example 39: The method of any one of Examples 30-38, wherein the first content location and the second content location are at the same height from the ground.

Example 40: The method of Example 39, wherein a pitch of the interactive content is fixed with respect to a head height of the user.

Example 41: The method of any one of Examples 30-40 comprising:
receiving an indication to stop moving the interactive content; and
in response to receiving the indication to stop moving, maintaining display of the interactive content at a current content location within the environment of the user.

Example 42: The method of Example 41 comprising:
receiving an indication to begin moving the interactive content; and
in response to receiving the indication to begin moving, allowing the interactive content to be displayed at a new location within the environment of the user.

Example 43: Any of the above examples wherein the interactive content object comprises a bounded volume containing a virtual object.

J. Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps or actions may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality (AR) system comprising:
    an AR display configured to present virtual content to a user of the AR system;
    an outward facing camera configured to capture one or more images of an environment of the user;
    a handheld controller defining a pointing vector indicating a pointing direction of the handheld controller;
    a hardware processor in communication with the AR display, the outward facing camera, and the handheld controller, the hardware processor programmed to:
        display an interactive content object via the AR display;
        while the pointing vector remains within the interactive content object, indicate movements of the handheld controller within the interactive content object and allow interactions with the interactive content object via the handheld controller;
        monitor changes of the pointing vector with reference to the interactive content object;
        determine a height of the interactive content object with respect to a height of the user;
        determine a first user head pose;
        identify a first user gaze vector based on the first user head pose; and
        orient the interactive content at an angle based on the first user gaze vector and the height of the interactive content object so that a surface of the interactive content object has an angle with respect to the first user gaze vector such that the user can more easily perceive the surface of the content.

2. The system of claim 1, wherein the interactive content object comprises a bounded volume containing a virtual object.

3. The system of claim 1, wherein at least one edge of the interactive content object is 10 degrees further away from the center of the virtual object than a corresponding edge of the virtual object.

4. The system of claim 1, wherein the hardware processor is configured to receive an indication to display the interactive content at a first content location.

5. The system of claim 4, wherein the indication comprises a press and release of a button on the controller.

6. The system of claim 1, wherein the hardware processor is configured to alert the user to the display of interactive content at the first content location.

7. The system of claim 6, wherein the alert comprises at least one of: graphics, haptic feedback, or sounds.

8. The system of claim 1, wherein the hardware processor is configured to receive an indication to stop displaying the interactive content in the environment of the user.

9. The system of claim 8, wherein the indication comprises a press and release of a button on the controller.

10. The system of claim 1, wherein the angle is such that the surface of the interactive content object is perpendicular to a user gaze vector.

11. A method of displaying interactive virtual content in a user's environment, the method comprising:
- displaying an interactive content object via an Augmented Reality (AR) display configured to present virtual content to a user;
- while a pointing vector of a handheld controller in communication with the AR display remains within the interactive content object, indicating movements of the handheld controller within the interactive content object and allowing interactions with the interactive content object via the handheld controller;
- monitoring changes of the pointing vector with reference to the interactive content object;
- determining a height of the interactive content object with respect to a height of the user;
- determining a first user head pose;
- identifying a first user gaze vector based on the first user head pose; and
- orienting the interactive content at an angle based on the first user gaze vector and the height of the interactive content object so that a surface of the interactive content object has an angle with respect to the first user gaze vector such that the user can more easily perceive the surface of the content.

12. The method of claim 11, wherein the interactive content object comprises a bounded volume containing a virtual object.

13. The method of claim 11, wherein at least one edge of the interactive content object is 10 degrees further away from the center of the virtual object than a corresponding edge of the virtual object.

14. The method of claim 11, comprising receiving an indication to display the interactive content at a first content location.

15. The method of claim 14, wherein the indication comprises a press and release of a button on the controller.

16. The method of claim 14, comprising alerting the user to the display of interactive content at the first content location.

17. The method of claim 16, wherein the alert comprises at least one of: graphics, haptic feedback, or sounds.

18. The method of claim 11, comprising receiving an indication to stop displaying the interactive content in the environment of the user.

19. The method of claim 18, wherein the indication comprises a press and release of a button on the controller.

20. The method of claim 11, wherein the angle is such that the surface of the interactive content object is perpendicular to a user gaze vector.

* * * * *